United States Patent [19]

Iijima et al.

[11] Patent Number: 5,683,838

[45] Date of Patent: Nov. 4, 1997

[54] METHOD OF PRODUCING INFORMATION RECORDING MEDIUM

[75] Inventors: Masayuki Iijima; Seiji Take; Hironori Kamiyama; Masato Okabe; Hiroyuki Obata; Minoru Utsumi, all of Tokyo, Japan

[73] Assignee: Dai Nippon Printing Co., Ltd., Tokyo, Japan

[21] Appl. No.: 578,195

[22] Filed: Dec. 29, 1995

Related U.S. Application Data

[60] Division of Ser. No. 48,918, Apr. 19, 1993, Pat. No. 5,514,504, which is a continuation-in-part of Ser. No. 930,601, Sep. 29, 1992, abandoned.

[30] Foreign Application Priority Data

| Jan. 31, 1991 | [JP] | Japan | 3-010847 |
| Jan. 31, 1991 | [JP] | Japan | 3-010848 |
| Jun. 12, 1991 | [JP] | Japan | 3-140305 |
| Apr. 20, 1992 | [JP] | Japan | 4-099626 |

[51] Int. Cl.$^6$ .................................................. G02F 1/135
[52] U.S. Cl. ........................ 430/20; 430/321; 427/508; 427/164; 427/293; 156/269; 156/275.5; 156/273.9
[58] Field of Search ................ 430/20, 321; 427/508, 427/108, 109, 164, 289, 293; 156/101, 269, 275.5, 279.3

[56] References Cited

U.S. PATENT DOCUMENTS

| 4,728,547 | 3/1988 | Vaz et al. | 428/1 |
| 4,944,576 | 7/1990 | Lacker et al. | 359/51 |
| 5,011,264 | 4/1991 | Yamagishi et al. | 359/52 |
| 5,073,219 | 12/1991 | McArdle et al. | 156/242 |
| 5,204,763 | 4/1993 | Hikmet | 359/51 |
| 5,206,746 | 4/1993 | Ooi et al. | 359/40 |
| 5,268,783 | 12/1993 | Yoshinaga et al. | 359/103 |
| 5,474,629 | 12/1995 | Yamazaki et al. | 156/99 |

FOREIGN PATENT DOCUMENTS

| 59-216126 | 12/1984 | Japan . |
| 60-218629 | 11/1985 | Japan . |
| 62-002267 | 1/1987 | Japan . |
| 63-137211 | 6/1988 | Japan . |
| 1-097921 | 4/1989 | Japan . |
| 2245734 | 10/1990 | Japan . |
| 0403277 | 12/1990 | Japan . |

*Primary Examiner*—John A. McPherson
*Attorney, Agent, or Firm*—Dellett and Walters

[57] ABSTRACT

Information recording media enable images to be recorded and reproduced with high resolution, wherein oozing of liquid crystal material thereof is prevented and the information is recorded without unevenness. A first recording medium has an information recording layer comprising a liquid crystal phase and an ultraviolet curing resin phase. The information recording layer is stacked on an electrode layer provided on a substrate by coating a mixed solution of liquid crystal and ultraviolet curing resin material on the surface of the electrode layer and then irradiating the coating by irradiation with ultraviolet rays, thereby forming a cured skin layer of the resin material on the outer surface of the information recording layer. A second recording medium has a transparent electrode layer additionally provided on the information recording layer of the first recording medium. A third recording medium has an electrode layer, a photoconductive layer, an information recording layer, and an electrode layer, in successive order. A fourth recording medium has a transparent insulating layer or semiconductor layer interposed between the photoconductive layer and the information recording layer of the third recording medium. According to an information recording and reproducing method employing the first recording medium, a gradually increasing voltage is applied between a photosensitive member and the recording medium. As a result, the effective voltage applied to the liquid crystal layer can be raised, enabling increased modulation, improved contrast and responsiveness.

2 Claims, 14 Drawing Sheets

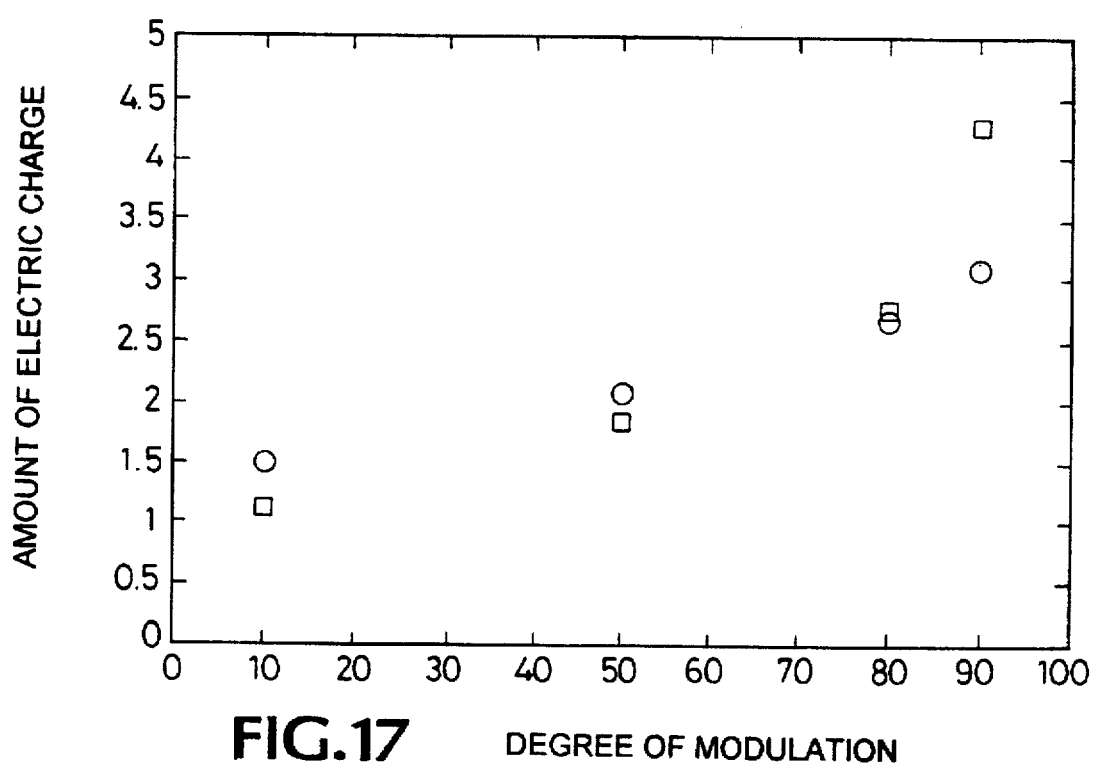
FIG.17  DEGREE OF MODULATION

METHOD OF PRODUCING INFORMATION RECORDING MEDIUM

This is a divisional of application Ser. No. 08/048,918 filed on Apr. 19, 1993, now U.S. Pat. No. 5,514,504, which is a continuation-in-part of Ser. No. 07/930,601 filed Sep. 29, 1992, now abandoned. International Application PCT/JP92/00083 filed on Jan. 29, 1992 and which designated the U.S.

BACKGROUND OF THE INVENTION

The present invention relates to an information recording medium, an information recording and reproducing method, and an information recording medium producing method. More particularly, the present invention relates to an information recording medium which has an information recording layer consisting of a dispersion type of liquid crystal and which enables information to be recorded thereon as visible information by exposure carried out under voltage application or by application of a voltage, and also relates to an information recording and reproducing method for such an information recording medium and to an information recording medium producing method.

In conventional electrophotographic technology, an information recording medium is known which comprises a liquid crystal cell having a nematic liquid crystal material sealed therein that is stacked on a photoconductive layer, an insulating layer for liquid crystal alignment that is stacked on the liquid crystal cell, and a pair of electrodes that sandwich the cell structure. To record information, the information recording medium is exposed to information light under application of a voltage between the electrodes, thereby lowering the resistance of the photoconductive layer at regions exposed in the pattern of the applied information light, aligning the liquid crystal molecules in the exposed regions, and thus obtaining a visible image by using a polarized light plate.

The known information recording medium necessitates formation of a cell for sealing a liquid crystal therein. In addition, it is necessary in order to effect initial twisted nematic alignment to provide insulating films which have been subjected to alignment treatment by rubbing or the like on both surfaces of the cell, and it is also necessary to mix the liquid crystal material with a spacer in order to maintain the cell gap at a constant level. For these reasons, the conventional information recording medium cannot obtain images of high resolution. Further, since rigid and transparent substrates are needed to provide a gap or to form a cell, optical problems are associated with the prior art. There is another problem in that the information recording medium which has been subjected to alignment treatment in its initial state needs a polarized light plate to detect the recorded information.

In the meantime, an information recording medium in which a polymer dispersed liquid crystal is used as a liquid crystal layer in the liquid crystal cell has recently been developed. In such an information recording medium, the liquid crystal layer is sandwiched between two substrates having ITO electrodes. However, if this information recording medium is arranged in a structure comprising a substrate, an ITO electrode, and a liquid crystal layer and it is used in an information recording method wherein exposure is carried out under voltage application with the information recording medium placed face-to-face with a photosensitive member, thereby recording electrostatic information on the liquid crystal layer by an electric discharge phenomenon occurring in accordance with the information light applied thereto, the polymer dispersed liquid crystal may ooze out on the surface of the liquid crystal layer, resulting in noise that affects the information recording operation.

In a case where an ITO electrode is formed directly on a liquid crystal layer to realize an arrangement that comprises a substrate, an ITO electrode, a liquid crystal layer, and an ITO electrode and where a voltage is applied between the two electrodes to align the molecules in the liquid crystal layer to thereby record information, the ITO electrode on the surface layer may be cracked or raised by oozing of the liquid crystal, resulting in a lowering in the electrical conductivity. In addition, when an electrode layer and a liquid crystal layer are formed by laminating, problems arise in terms of the uniformity of the gap and the noise induced by the spacer.

Further, in a case where a smectic liquid crystal is dispersed in the resin material, the memory effect is particularly good, so that even after the removal of the electric field, the modulated molecular alignment is maintained as it is; even if the information recording medium is left to stand for a long time, the recorded information can be read. Since the recorded visible image can be erased by heating the information recording medium to a temperature near the isotropic phase transition temperature, the information recording medium can be reused.

However, if information is recorded on the information recording layer of an information recording medium that employs such a liquid crystal by carrying out exposure under voltage application with the information recording medium placed face-to-face with a photosensitive member, the liquid crystal may ooze out on the surface of the information recording layer, resulting in noise that affects the information recording operation. It is also difficult to maintain the gap between the photosensitive member and the information recording medium at a constant level.

Incidentally, a liquid crystal recording medium is suitable for use in the form of a card, a disk, a film, etc. because it enables the recorded information to be optically read with ease. In such applications, it is desirable to fix the gap between the photosensitive member and the liquid crystal recording medium by forming them together as one unit. In the case of such a card type liquid crystal recording medium, it is necessary to form a transparent electrode or the like on the information recording layer. However, since the information recording layer, which comprises a liquid crystal dispersed in a resin material, is soft, it is difficult to form an electrode on the information recording layer, and the recording layer is likely to be damaged. In addition, the information recording layer involves the above-described problem of oozing of the liquid crystal. In particular, when the liquid crystal recording medium is placed under severe environmental conditions where it is touched with human hands as in the case of a card or a disk, the liquid crystal recording medium is likely to be damaged or deformed, which results in noise that affects the reliability of the data. Accordingly, it is extremely important to eliminate such a cause of noise when the liquid crystal recording medium is used as a card. It has also been demanded to develop a technique of continuously producing card type liquid crystal recording media.

It is an object of the present invention to provide an information recording medium which enables information to be recorded with high accuracy without using a liquid crystal cell and which allows easy reproduction of the recorded information, and also provide an information recording and reproducing method for such an information recording medium. More particularly, it is an object of the present invention to provide an information recording medium which is free from unevenness of recorded information which would otherwise be caused by oozing of a polymer dispersed liquid crystal when used as an information recording layer, and also to provide an information recording and reproducing method for such an information recording medium and an information recording medium producing method.

SUMMARY OF THE INVENTION

The first information recording medium of the present invention is characterized in that an information recording layer which comprises a liquid crystal phase and an ultraviolet curing resin phase is provided on an electrode layer, the information recording layer being formed by coating a mixed solution of a liquid crystal and an ultraviolet curing resin material on the surface of the electrode layer and then curing the coating by irradiation with ultraviolet rays, thereby forming a skin layer of the ultraviolet curing resin material on the outer surface of the information recording layer.

The first information recording medium retains a liquid crystal in the information recording layer in such a manner that the liquid crystal will not ooze out on the surface of the information recording layer. Accordingly, when this information recording medium is used for an information recording method in combination with a photosensitive member or the like, information recording will not be disordered by the liquid crystal which might otherwise ooze out on the surface of the information recording layer, so that it is possible to record electrostatic information without unevenness. In addition, since the information recording layer can be formed into a uniform thin film by coating technique, the gap between the electrode layer and the information electric charge formed on the information recording layer can be minimized and made uniform, and it is possible to produce an information recording medium having a wide area and hence possible to record and reproduce an image with high resolution.

The first information recording and reproducing method of the present invention comprises the steps of: preparing an information recording medium wherein an information recording layer which comprises a liquid crystal phase and an ultraviolet curing resin phase is provided on an electrode layer, the information recording layer being formed by coating a mixed solution of a liquid crystal and an ultraviolet curing resin material on the surface of the electrode layer and then curing the coating by irradiation with ultraviolet rays, thereby forming a skin layer of the ultraviolet curing resin material on the outer surface of the information recording layer; disposing the information recording medium face-to-face with a photosensitive member having a photoconductive layer provided on an electrode layer, either in or out of contact with each other; applying information light for exposure from either the photosensitive member side or the information recording medium side with a voltage applied between the respective electrode layers of the information recording medium and the photosensitive member, thereby aligning the molecules in the liquid crystal phase in the pattern of the applied information light, and thus recording the desired information; and reproducing the recorded information as visible information by using transmitted light or reflected light.

In the above method, wherein exposure is carried out by applying information light with a voltage applied between the two electrode layers, thereby modulating the molecular alignment in the liquid crystal layer, and thus recording the desired information, it is preferable to gradually increase the voltage applied between the electrode layers.

The second information recording medium of the present invention is characterized in that an information recording layer which comprises a liquid crystal phase and an ultraviolet curing resin phase and a first electrode layer are successively provided on a second electrode layer, at least one of the electrode layers being transparent, and the information recording layer being formed by coating a mixed solution of a liquid crystal and an ultraviolet curing resin material on the surface of the second electrode layer and then curing the coating by irradiation with ultraviolet rays, thereby forming a skin layer of the ultraviolet curing resin material on the outer surface of the information recording layer.

In the case of the second information recording medium, since it is possible to prevent the liquid crystal from oozing out on the surface of the information recording layer, even if an electrode layer comprising an ITO film or the like is formed by vapor deposition or other similar process, the electrode layer will not be wrinkled or cracked. Accordingly, it is possible to prevent deterioration of the electrical conductivity. In addition, since the electrode layer can be provided directly on the information recording layer, the gap between the two electrode layers can be made uniform.

The second information recording and reproducing method of the present invention comprises the steps of: preparing an information recording medium wherein an information recording layer which comprises a liquid crystal phase and an ultraviolet curing resin phase and a first electrode layer are successively provided on a second electrode layer, at least one of the electrode layers being transparent, at least one of the electrode layers having been patterned, and the information recording layer being formed by coating a mixed solution of a liquid crystal and an ultraviolet curing resin material on the surface of the second electrode layer and then curing the coating by irradiation with ultraviolet rays, thereby forming a skin layer of the ultraviolet curing resin material on the outer surface of the information recording layer; applying a voltage between the two electrode layers to align the molecules in the liquid crystal phase in accordance with the patterned electrode layer, thereby recording information; and reproducing the recorded information as visible information by using transmitted light or reflected light.

The third information recording medium of the present invention is characterized by comprising a first electrode layer, a photoconductive layer, an information recording layer, and a second electrode layer, which are provided successively, and in that at least one of the electrode layers is transparent and the information recording layer is formed by coating a mixed solution of a liquid crystal and an ultraviolet curing resin material and then curing the coating by irradiation with ultraviolet rays, thereby forming a skin layer of the ultraviolet curing resin material on the outer surface of the information recording layer.

The third information recording medium has an information recording layer and a photoconductive layer in between two electrode layers and is arranged such that when exposure is carried out by applying information light thereto with a voltage applied between the two electrode layers, the molecules in the liquid crystal phase of the information recording layer are aligned in the pattern of the applied information light at the exposed regions under the influence of an electric field that is formed by carriers generated in the photoconductive layer, thereby enabling the desired information to be recorded.

The fourth information recording medium of the present invention is characterized by comprising a first electrode layer, a photoconductive layer, either a transparent insulating layer or a transparent semiconductor layer, an information recording layer, and a second electrode layer, which are provided successively, and in that at least one of the electrode layers is transparent and the information recording layer is formed by coating a mixed solution of a liquid crystal and an ultraviolet curing resin material and then curing the coating by irradiation with ultraviolet rays, thereby forming a skin layer of the ultraviolet curing resin material on the outer surface of the information recording layer.

The fourth information recording medium, which is applied in a case where the photoconductive layer is formed particularly by coating an organic photosensitive material, enables the information recording layer to be formed by a coating method without elution of the photoconductive layer, thus making it possible to eliminate the interaction between the photoconductive layer and the information recording layer, and hence unevenness of recorded information.

The card-, disk- or film-type information recording medium of the present invention is characterized by comprising a first electrode layer, a photoconductive layer, an information recording layer, and a second electrode layer, which are provided successively, and in that at least one of the electrode layers is transparent, and at least one of the electrode layers serves as a common electrode, while the other electrode layer serves as an area selecting electrode, the electrode layers being each provided with a contact reinforcing electrode, and further in that the information recording layer is formed by coating a mixed solution of a liquid crystal and an ultraviolet curing resin material and then curing the coating by irradiation with ultraviolet rays, thereby forming a skin layer of the ultraviolet curing resin material on the outer surface of the information recording layer.

Further, the fifth information recording medium of the present invention is characterized by comprising a first electrode layer, a photoconductive layer, either a transparent insulating layer or a transparent semiconductor layer, an information recording layer, and a second electrode layer, which are provided successively, and in that at least one of the electrode layers is transparent, and at least one of the electrode layers serves as a common electrode, while the other electrode layer serves as an area selecting electrode, the electrode layers being each provided with a contact reinforcing electrode, and further in that the information recording layer is formed by coating a mixed solution of a liquid crystal and an ultraviolet curing resin material and then curing the coating by irradiation with ultraviolet rays, thereby forming a skin layer of the ultraviolet curing resin material on the outer surface of the information recording layer.

The fifth information recording medium is a card type information recording medium, and it may be formed in the shape of a disk or a film.

The method of producing the fifth information recording medium according to the present invention is characterized by comprising the steps of: forming a transparent common electrode by sputtering on a transparent first base film continuously supplied, and forming a contact reinforcing electrode by evaporation on the transparent common electrode along one edge of the base film; coating a photoconductive layer or a stack of a photoconductive layer and either a transparent insulating layer or a transparent semiconductor layer on the transparent common electrode; forming a transparent area selecting electrode in a belt-shaped pattern by sputtering on a second base film continuously supplied so that the area selecting electrode extends from one edge to the other edge of the second base film, and forming a contact reinforcing electrode on a root portion of the area selecting electrode by evaporation; continuously supplying the first base film formed with the stack of the transparent common electrode and the photoconductive layer or the stack of the transparent common electrode, the photoconductive layer and the transparent insulating layer or transparent semiconductor layer and the second base film formed with the area selecting electrode, and coating an information recording layer comprising a liquid crystal dispersed and fixed in an ultraviolet curing resin material on the electrode layer side of either the first or second base film, and curing the resin material by irradiation with ultraviolet rays with the two base films butted against each other; and cutting the resulting information recording medium into a predetermined length after the resin material has been cured.

According to the fifth information recording medium of the present invention and the method of producing the same, it is possible to realize a card, disk or film type liquid crystal recording medium which is free from oozing of the liquid crystal and which has no possibility that the transparent electrode on the information recording layer will be damaged when information is recorded or reproduced. In addition, such liquid crystal recording media can be produced continuously.

The information recording and reproducing method for the first, third, fourth and fifth information recording media according to the present invention comprises the steps of: applying information light for exposure with a voltage applied between the two electrode layers of the information recording medium, thereby aligning the molecules in the liquid crystal phase in the pattern of the applied information light, and thus recording the desired information; and reproducing the recorded information as visible information by using transmitted light or reflected light.

Further, in the information recording and reproducing method for the first, third, fourth and fifth information recording media of the present invention, a gradually increasing voltage may be applied between a photosensitive member and a liquid crystal recording medium having a liquid crystal layer stacked on a transparent electrode, thereby allowing the greater part of the voltage increment to be applied to the liquid crystal layer. As a result, even if the initial voltage that is applied to the liquid crystal layer is low, the effective voltage applied thereto can be raised by increasing the rate of rise of the applied voltage, and it is therefore possible to increase the degree of modulation and improve the contrast. It is also possible to improve the response.

In addition, the information recording media of the present invention are each arranged such that when no electric field is applied thereto, the information recording part is opaque due to light scattering, whereas, when an electric field is applied thereto, the molecules in the liquid crystal phase are aligned so as to make the information recording part transparent, thus enabling analog information to be recorded by modulating the electric field. No polarized light plate is required for reproduction of the recorded information. In addition, the optical system for reading information can be simplified. Since a skin layer of a resin material is formed on the surface of the information recording layer, it is possible to prevent the liquid crystal from oozing out on the surface of the information recording layer, and the resistance of the information recording layer can be raised. Further, a transparent electrode layer can be formed by a dry process, e.g., vapor deposition, sputtering, CVD, etc., or a wet process, e.g., coating, plating, dipping, electrolytic polymerization, etc. Further, since the information recording layer can contain a large amount of liquid crystal, the film thickness can be reduced, the operating voltage can be set to a low level, and a visible image of high sensitivity, high contrast and high quality can be formed.

BRIEF DESCRIPTION OF THE DRAWINGS

FIG. 17 is a graph showing the relationship between the degree of modulation of the liquid crystal and the amount of electric charge needed therefor.

DESCRIPTION OF THE PREFERRED EMBODIMENTS

The information recording medium and information recording and reproducing method of the present invention will be described below.

Figure 1:
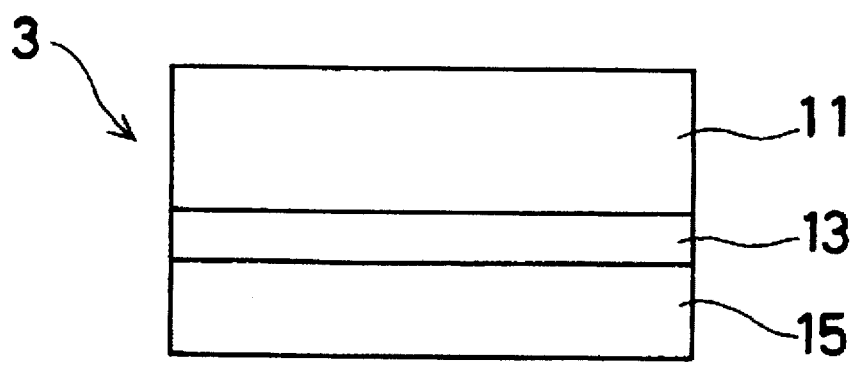
FIG. 1 is a sectional schematic view of the first information recording medium according to the present invention.

FIG. 1 is a schematic sectional view of the first information recording medium according to the present invention, in which reference numeral 3 denotes an information recording medium, 11 an information recording layer, 13 an electrode layer, and 15 a substrate.

The electrode layer 13 is a metallic conductive thin film, an inorganic metallic oxide conductive film, or an organic conductive film, e.g., quaternary ammonium salt, which has a specific resistance not higher than $10^6$ ohm-cm. The electrode layer 13 is formed by vapor deposition, sputtering, CVD, coating, plating, dipping, electrolytic polymerization or the like. The thickness of the electrode layer 13 needs to be changed depending upon the electrical characteristics of the material thereof and the level of voltage applied to effect recording of information. If the electrode layer 13 comprises an ITO film, the thickness is about from 100 Å to 3,000 Å. The electrode layer 13 may be formed either on the whole area between the substrate 15 and the information recording layer 11 or in conformity with the pattern of the information recording layer 11 formed.

The substrate 15 is employed to support the information recording medium 3 having the shape of card, film, tape, disk or the like so as to provide the required strength. Accordingly, the substrate 15 need not be provided if the information recording layer 11 has supporting properties, and there are no specific restrictions on the thickness and material of the substrate 15, provided that it is sufficiently strong to support the information recording layer 11. Examples of usable materials are a flexible plastic film, or a rigid material such as glass, plastic sheet, card, etc. More specifically, when the information recording medium 3 is formed in the shape of a flexible film, tape, disk or card, a flexible plastic film is used as the substrate 15. When the information recording medium 3 is required to have a certain level of strength, a rigid sheet or inorganic material, for example, glass, is used as the substrate 15. It should be noted that the surface of the substrate 15 which is remote from the electrode layer 13 may be endowed with anti-reflection properties, if necessary, by stacking a layer having anti-reflection effect thereon, or by adjusting the film thickness of the transparent substrate to a level at which anti-reflection effect is obtainable, or by combining together these two measures.

The information recording layer 11 comprises a liquid crystal phase and a resin phase. Examples of usable liquid crystal materials are a smectic liquid crystal, nematic liquid crystal, cholesteric liquid crystal and a mixture of these liquid crystals. However, it is preferable to use a smectic liquid crystal from the point of view of retaining the liquid crystal alignment and holding the recorded information permanently, that is, from the viewpoint of memory effect.

Examples of smectic liquid crystals usable in the present invention are as follows: cyanobiphenyl, cyanoterphenyl and phenylester liquid crystals, in which the end group of a liquid crystalline substance has a long carbon chain; liquid crystal substances that present smectic A phase, e.g., fluorine liquid crystal; liquid crystal substances presenting smectic C phase, which are used as ferroelectric liquid crystals; and liquid crystal substances that present smectic H, G, E or F phase.

It is also possible to use a nematic liquid crystal. By mixing a nematic liquid crystal with a smectic or cholesteric liquid crystal, the memory effect can be enhanced. It is possible to use known nematic liquid crystals, for example, Schiff's base, azoxy, azo, phenyl benzoate, cyclohexyl phenyl ester, biphenyl, terphenyl, phenylcyclohexane, phenylpyridine, phenyloxazine, polycyclic ethane, phenylcyclohexene, cyclohexylpyrimidine, phenyl and tolane liquid crystals. It is also possible to use a mixture of a liquid crystal material and a polyvinyl alcohol or the like which is prepared in the form of micro-capsules. It should be noted that it is preferable to select a liquid crystal material having higher anisotropy of refractive index with a view to obtaining a higher contrast.

Examples of materials which are preferable to use for forming the resin phase are ultraviolet curing resin materials which are compatible with a liquid crystal material or a common solvent therewith in the form of a monomer or an oligomer.

Examples of such ultraviolet curing resin materials are acrylic and methacrylic esters, i.e., multifunctional monomers and multifunctional urethane and ester oligomers, e.g., dipentaerythritol hexaacrylate, trimethylolpropane triacrylate, polyethylene glycol diacrylate, polypropylene glycol diacrylate, isocyanuric acid (ethylene oxide modified) triacrylate, dipentaerythritol pentaacrylate, dipentaerythritol tetraacrylate, neopentyl glycol diacrylate, hexanediol diacrylate, etc., and monofunctional monomers or oligomers, e.g., nonyl phenol modified acrylate, N-vinyl-2-pyrrolidone, 2-hydroxy-3-phenoxypropyl acrylate, etc.

As to the solvent, any common solvent can be used, for example, hydrocarbon solvents represented by xylene, halogenated hydrocarbon solvents represented by chloroform, alcohol derivative solvents represented by methyl cellosolve, and ether solvents represented by dioxane.

Examples of photo-curing agents usable in the present invention are 2-hydroxy-2-methyl-1-phenylpropane-1-one ("Darocure 1173", manufactured by Merck & Co., Inc.), 1-hydroxycyclohexyl phenyl ketone ("Irgacure 184", manufactured by Ciba-Geigy Ltd.), 1-(4-isopropylphenyl)-2-hydroxy-2-methylpropane-1-one ("Darocure 1116", manufactured by Merck & Co., Inc.), benzyl dimethyl ketal ("Irgacure 651", manufactured by Ciba-Geigy Ltd.), 2-methyl-1-[4-(methylthio)phenyl]-2-morpholinopropanone-1 ("Irgacure 907", manufactured by Ciba-Geigy Ltd.), a mixture of 2,4-diethylthioxanthone ("Kayacure DETX", manufactured by Nippon Kayaku Co., Ltd.) and p-dimethylamino ethyl benzoate ("Kayacute EPA", manufactured by Nippon Kayaku Co., Ltd.), and a mixture of isopropylthioxanthone ("Quantacure ITX", manufactured by Wordblekinsop Co., Ltd.) and p-dimethylamino ethyl benzoate. However, 2-hydroxy-2-methyl-1-phenylpropane-1-one, which is liquid, is particularly preferable from the viewpoint of compatibility with a liquid crystal and a resin material, e.g., a polymer forming monomer or oligomer.

It is preferable to use a liquid crystal and a resin material in such a ratio that the liquid crystal content in the information recording layer is 10% to 90% by weight, more preferably 40% to 80% by weight. If the liquid crystal content is less than 10% by weight, light transmittance is low even when the molecules in the liquid crystal phase are aligned by recording of information, whereas, if the liquid crystal content exceeds 90% by weight, oozing of the liquid crystal results in a decrease in the quantity of liquid crystal, causing unevenness of the recorded information. By allowing the information recording layer to contain a large amount of liquid crystal, the contrast ratio can be improved, and the operating voltage can be lowered.

The information recording layer is formed by a method wherein a mixed solution of a resin material and a liquid crystal is coated on an electrode layer by a coating method using a blade coater, a roll coater or a spin coater and then cured. If necessary, a leveling agent may be added to the mixed solution to improve the coatability of the solution and to thereby obtain excellent surface properties.

In addition, it is necessary to heat the solution to a level higher than the temperature at which the liquid crystal maintains its isotropic phase, and to dissolve the liquid crystal and the ultraviolet curing resin material in each other completely. If the information recording layer is ultraviolet-cured at a temperature lower than the temperature at which the mixture of the ultraviolet curing resin material and the liquid crystal shows an isotropic phase, partial phase separation occurs between the liquid crystal and the resin material, thus giving rise to problems. That is, the liquid crystal domain grows excessively, preventing the skin layer from being formed completely over the surface of the information recording layer, so that the liquid crystal will ooze out. In addition, the ultraviolet curing resin material is matted, so that it becomes difficult to take in information accurately. Further, there are cases where the ultraviolet curing resin material cannot even retain the liquid crystal and hence no information recording layer is formed. On the other hand, if heating is needed for maintaining the isotropic phase when the solvent is evaporated, particularly, wetting properties of the mixed solution with respect to the electrode layer lower, making it impossible to obtain a uniform information recording layer.

Further, a fluorocarbon surface-active agent may be added for the purpose of maintaining the wetting properties with respect to the electrode layer and forming a skin layer on the surface of the information recording layer. Examples of fluorocarbon surface-active agents usable for this purpose include Fluorad FC-430 and FC-431 (manufactured by Sumitomo 3M (K.K.)), N-(n-propyl)-N-(β-acryloxyethyl) perfluorooctyl sulfonamide (EF-125M, manufactured by Mitsubishi Material Co., Ltd.), N-(n-propyl)-N-(β-methacryloxyethyl)-perfluorooctyl sulfonamide (EF-135M, manufactured by Mitsubishi Material Co., Ltd.), perfluorooctanesulfonic acid (EF-101, manufactured by Mitsubishi Material Co., Ltd.), perfluorocaprylic acid (EF-201, manufactured by Mitsubishi Material Co., Ltd.), and N-(n-propyl)-N-perfluorooctane sulfonamide ethanol (EF-121, manufactured by Mitsubishi Material Co., Ltd.), and further include EF-102, EF-103, EF-104, EF-105, EF-112, EF-121, EF-122A, EF-122B, EF-122C, EF-122A3, EF-123A, EF-123B, EF-132, EF-301, EF-303, EF-305, EF-306A, EF-501, EF-700, EF-201, EF-204, EF-351, EF-352, EF-801, EF-802, EF-125DS, EF-1200, EFL-102, EF-L155, EF-L174 and EF-L215, which are manufactured by Mitsubishi Material Co., Ltd.). It is also possible to use 3-(2-perfluorohexyl)ethoxy-1,2-dihydroxypropane (MF-100, manufactured by Mitsubishi Material Co., Ltd.), N-n-propyl-N-2,3-dihydroxypropylperfluorooctyl sulfonamide (MF-110, manufactured by Mitsubishi Material Co., Ltd.), 3-(2-perfluorohexyl)ethoxy-1,2-epoxypropane (MF-120, manufactured by Mitsubishi Material Co., Ltd.), N-n-propyl-N-2,3-epoxypropylperfluorooctyl sulfonamide (M-130, manufactured by Mitsubishi Material Co., Ltd.), perfluorohexyl ethylene (MF-140, manufactured by Mitsubishi Material Co., Ltd.), N-[3-trimethoxysilyl)propyl]perfluoroheptyl carboxylic acid amide (MF-150, manufactured by Mitsubishi Material Co., Ltd.), N-[3-trimethoxysilyl)propyl] perfluoroheptyl sulfonamide (MF-160, manufactured by Mitsubishi Material Co., Ltd.), etc. The fluorocarbon surface-active agent is used in the proportions of 0.1% to 20% by weight to the total amount of liquid crystal and resin material used.

In addition, the concentration of solid matter in the coating solution used for formation of an information recording layer is preferably set in the range of 10% to 60% by weight. When the coating layer is to be cured, curing conditions, i.e., the kind of resin material used, concentration, coating layer temperature and ultraviolet irradiation conditions, are properly set, thereby making it possible to form a skin layer made of only a resin layer, that is, having no liquid crystal phase, as an outer surface layer. The skin layer that is formed on the outer surface of the information recording layer makes it possible to increase the proportion of liquid crystal used in the information recording layer and also possible to prevent the liquid crystal from oozing out on the surface of the information recording layer.

Since the thickness of the information recording layer influences the definition of recorded information, it is preferable to set the thickness of the layer after it has been dried in the range of 0.1 μm to 10 μm, more preferably 3 μm to 8 μm. By doing so, the operating voltage can be lowered with the definition maintained at high level. If the information recording layer is excessively thin, the contrast of the information recording part becomes low, whereas, if the layer is excessively thick, the operating voltage becomes high.

Next, a photosensitive member that is used for recording information onto the above-described information recording medium will be explained. The photosensitive member, which is denoted by reference numeral 1 in FIG. 2(a) (described later), may be either a single-layer photosensitive member or a laminated photosensitive member. The single-layer photosensitive member is formed by stacking a mixture of a charge generating substance and a charge transport substance on an electrode 7. The laminated photosensitive member has a charge generation layer and a charge transport layer, which are stacked successively on the electrode 7.

The photosensitive member used in the present invention preferably uses as a charge generating substance a bis-azo compound, for example, which is represented by formula (1):

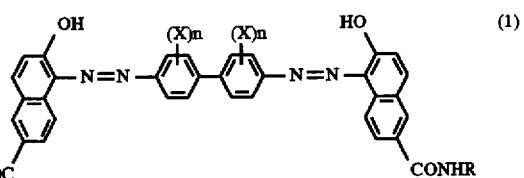

(where X, which may be identical or different, is selected from among hydrogen, a lower alkyl group, lower alkoxy group, nitro group, sulfonic acid group, hydroxyl group, carboxyl group, and halogen atom; n is an integer of 0 to 3; and R is a hydrocarbocyclic group, heterocyclic group, or alkyl group, which may be substituted.)

Thus, the photosensitive member used in the present invention is capable of giving electrostatic information corresponding to the information pattern to a liquid crystal medium with high sensitivity and high contrast. However, it is also possible to use other materials, for example, azo pigments, trisazo pigments, phthalocyanine pigments, perylene pigments, pyrylium pigments, cyanine pigments, and methine pigments.

Examples of bis-azo compounds which are preferable to use in the present invention are shown in below in accordance with the combination with each substituent group in the above formula (1):

| No | X | n | R |
|---|---|---|---|
| 1 | Cl | 1 | phenyl |
| 2 | Cl | 1 | p-chlorophenyl |
| 3 | Cl | 1 | 1-naphtyl |
| 4 | Cl | 1 | m-trifluoromethylphenyl |
| 5 | Cl | 1 | 2-thiazolyl |
| 6 | Cl | 1 | 2,5-dimethoxy-4-chlorophenyl |
| 7 | Cl | 1 | m-stearyl |
| 8 | Cl | 2 | phenyl |
| 9 | Br | 1 | phenyl |
| 10 | Br | 1 | p-chlorophenyl |
| 11 | F | 1 | p-methoxyphenyl |
| 12 | $CH_3$ | 1 | phenyl |
| 13 | $CH_3$ | 1 | o-methylphenyl |
| 14 | $CH_3$ | 1 | 2-thiazolyl |
| 15 | $C_2H_5$ | 1 | phenyl |
| 16 | $OCH_3$ | 1 | phenyl |
| 17 | $OCH_3$ | 1 | p-chlorophenyl |
| 18 | $OCH_3$ | 1 | o-methoxyphenyl |
| 19 | $OC_2H_5$ | 1 | m-chlorophenyl |
| 20 | $NO_2$ | 1 | m-nitrophenyl |
| 21 | $SO_3H$ | 1 | 2,5-dimethoxy-4-chlorophenyl |
| 22 | OH | 1 | m-methylphenyl |
| 23 | COOH | 1 | o-methoxyphenyl |

The following are examples of particularly preferable bis-azo compounds among the above:

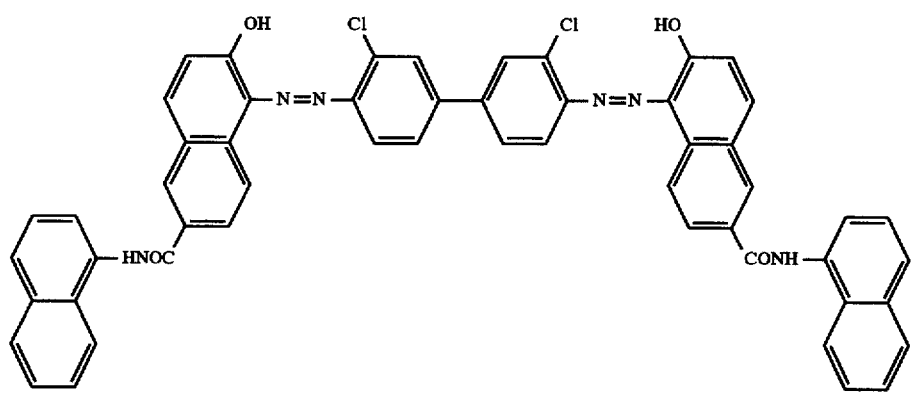

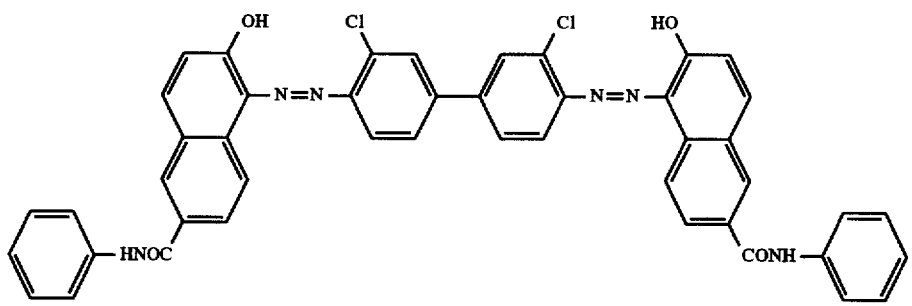

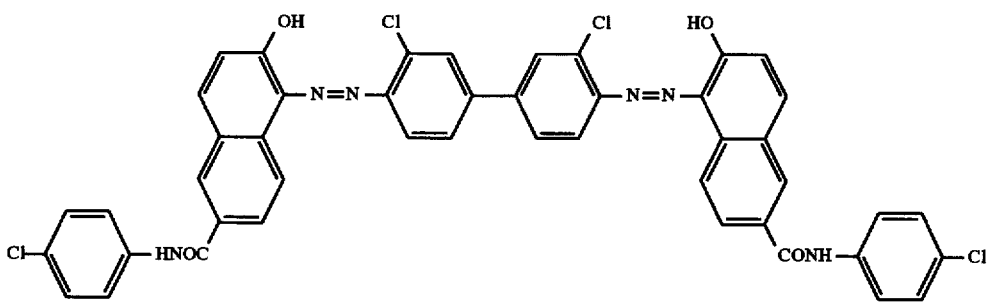

As a charge transport substance for forming a charge transport layer, a substance having excellent charge transport properties is used in order to transport electric charge generated by the charge generating substance. Examples of such substances are hydrazone, pyrazoline, polyvinylcarbazole, carbazole, stilbene, anthracene, naphthalene, tridiphenylmethane, azine, amine, aromatic amine, dibenzyl amine and enamine compounds, which have either hole or electron transport properties.

Among them, the following Compound Nos. (24) to (32) are preferable:

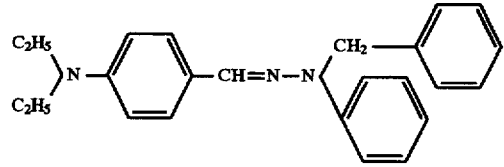
(24)

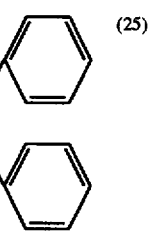
(25)

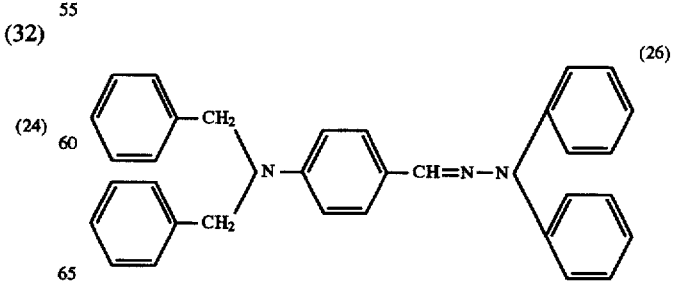
(26)

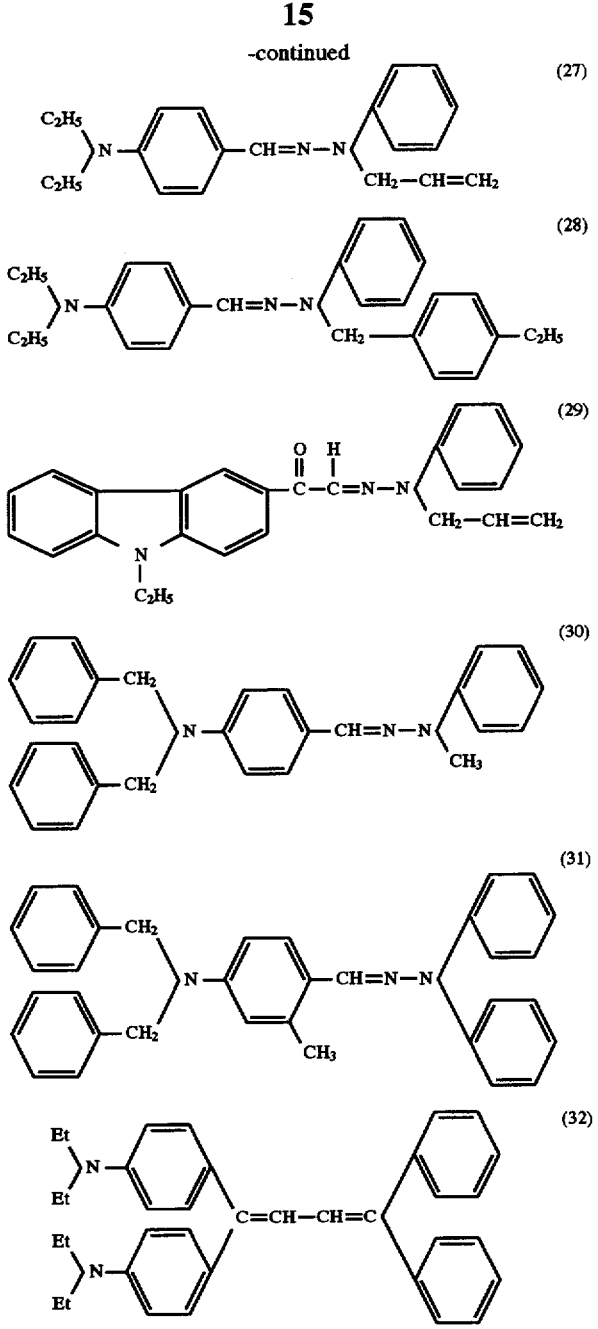

Next, a method of producing a photosensitive member will be explained.

First, in the case of a laminated photosensitive member, a charge generating substance and a polymeric binder are mixed together in the proportions of 1 to 10 parts by weight of the former to the 1 part by weight of the latter, and the resulting mixture is dispersed or dissolved in a proper medium. The solution thus prepared is applied over the electrode and dried to form a charge generation layer. In the meantime, a charge transport material is properly dissolved or dispersed in a solvent, together with a binder, and the resulting solution or dispersion is applied over the charge generation layer to form a charge transport layer. The charge generation layer and the charge transport layer are preferably 0.1 μm to 10 μm and 1 μm to 50 μm in dry film thickness, respectively.

In the case of a single-layer photosensitive member, a charge generating substance and a charge transport substance are preferably mixed together in the ratio of from 1:100 to 100:100 (parts by weight). The resulting mixture is dispersed or dissolved in a medium, and the dispersion or solution thus prepared is applied over the electrode and dried to form a layer. The thickness of the layer is preferably in the range of 1 μm to 50 μm.

It is also possible to form a complex from a charge generating substance and a charge transport substance and use it as a charge transfer complex. Generally, a photosensitive member has photosensitive characteristics which depend on the light absorption characteristics of the charge generating substance. However, if a complex is formed by mixing together a charge generating substance and a charge transport substance, the light absorption characteristics change. For example, polyvinylcarbazole (PVK) is only sensitive in ultraviolet region and trinitrofluorenone (TNF) is only sensitive near a wavelength of 400 nm, whereas PVK-TNF complex is sensitive up to 650 nm wavelength region.

In either the single-layer photosensitive member or the laminated photosensitive member, a binder can be used for formation of a photoconductive layer. Examples of usable binders include a silicone resin, styrene-butadiene copolymer resin, epoxy resin, acrylic resin, saturated or unsaturated polyester resin, polycarbonate resin, polyvinyl acetal resin, phenolic resin, polymethyl methacrylate (PMMA) resin, melamine resin, polyimide resin, vinyl chloride resin, vinyl acetate resin, etc. It is preferable to use 0.1 part to 10 parts by weight of a binder per part by weight of each of the charge generating and transport substances. It should be noted that if a charge generating or transport substance per se serves also as a binder, no binder is needed.

Examples of solvents usable in the present invention are dichloroethane, 1,1,2-trichloroethane, monochlorobenzene, tetrahydrofuran, cyclohexanone, dioxane, 1,2,3-trichloropropane, ethyl cellosolve, 1,1,1-trichloroethane, methyl ethyl ketone, chloroform, toluene, etc.

Coating methods usable in the present invention are blade coating, dipping, spin coating, spray coating, etc.

There are no specific restrictions on the thickness and material of a photosensitive member substrate 5, provided that it is sufficiently strong to support the photosensitive member. Examples of usable materials are a flexible plastic film, metal foil, paper or a rigid material such as glass, plastic sheet, metal sheet (capable of serving also as an electrode), etc. However, if the photosensitive member is employed in a system wherein light is applied from the photosensitive member side to record information, the substrate 5 needs to be capable of transmitting the light, as a matter of course. For example, if the photosensitive member is employed in a camera wherein natural light is applied as incident light from the photosensitive member side, a transparent glass sheet or a plastic film or sheet, which has a thickness of about 1 mm, is used.

A photosensitive member electrode 7 is formed on the photosensitive member substrate 5 except when the substrate 5 comprises a metallic material. There is no restriction on the material of the electrode 7, provided that the resistivity of the material is not higher than $10^6$ ohm-cm. Examples of such material are an inorganic metallic conductive film, an inorganic metallic oxide conductive film, and an organic conductive film, e.g., quaternary ammonium salt. Such an electrode is formed on the photosensitive member substrate 5 by evaporation, sputtering, CVD, coating, plating, dipping, electrolytic polymerization or the like.

The film thickness of the electrode 7 needs to be changed depending upon the electrical characteristics of the material thereof and the level of voltage applied to effect recording of information. If the electrode 7 is made of aluminum, for example, the thickness is about from 100 Å to 3,000 Å. If information light needs to be incident on the electrode 7 in the same way as in the case of the substrate 5, the electrode 7 is required to have the above-described optical characteristics. If the information light is visible light (400 nm to 700 nm), the photosensitive member electrode 7 may be a transparent electrode, translucent electrode or transparent organic electrode. The transparent electrode may be formed by sputtering or evaporating ITO ($In_2O_3$-$SnO_2$), $SnO_2$ or the like or by coating a mixture of a fine powder of such a material and a binder in the form of ink. The translucent electrode may be produced by evaporating or sputtering Au, Al, Ag, Ni, Cr or the like. The transparent organic electrode may be formed by coating tetracyanoquinodimethane (TCNQ), polyacetylene or the like.

In a case where the information light is infrared light (700 nm or more) also, the above-mentioned electrode materials may be used. A colored visible light absorbing electrode may also be used for cutting off visible light, depending upon the situation. In a case where the information light is ultraviolet light (400 nm or less) also, the above-mentioned electrode materials may be basically used. However, an electrode substrate material which absorbs ultraviolet light (e.g., an organic polymeric material, soda glass or the like) is not preferable. A material which transmits ultraviolet light, such as quartz glass, is preferable.

In addition, it is preferable to form an antireflection film on the surface of the photosensitive member on which information light is incident. The antireflection film can be formed by depositing at least one layer of an inorganic material, for example, magnesium fluoride, titanium oxide, etc., by evaporation or sputtering.

The method of recording information on the first information recording medium according to the present invention will be explained below.

FIGS. 2(a)–2(d) illustrate a method of recording information on the information recording medium shown in FIG. 1. In the figure, reference numeral 1 denotes a photosensitive member, 5 a photoconductive layer substrate, 7 a photosensitive member electrode, 9 a photoconductive layer, and 17 a power source.

First, a transparent photosensitive member electrode 7 which is made of indium tin oxide (ITO) with a thickness of 1,000 Å is formed on a photoconductive layer substrate 5 made of glass with a thickness of 1 mm, and a photoconductive layer 9 with a thickness of about 10 μm is formed on the electrode 7, thereby forming a photosensitive member 1.

Figure 2A:
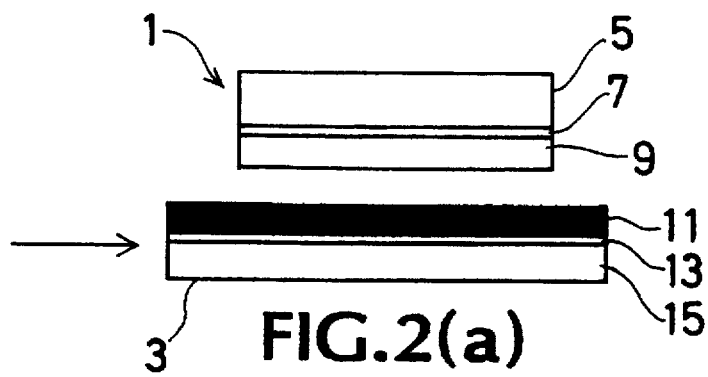
FIGS. 2(a)–2(d) illustrate a method of recording information on the first information recording medium according to the present invention.

As shown in FIG. 2(a), an information recording medium 3 is disposed face-to-face with the photosensitive member 1 across an air gap of about 10 μm.

Figure 2B:
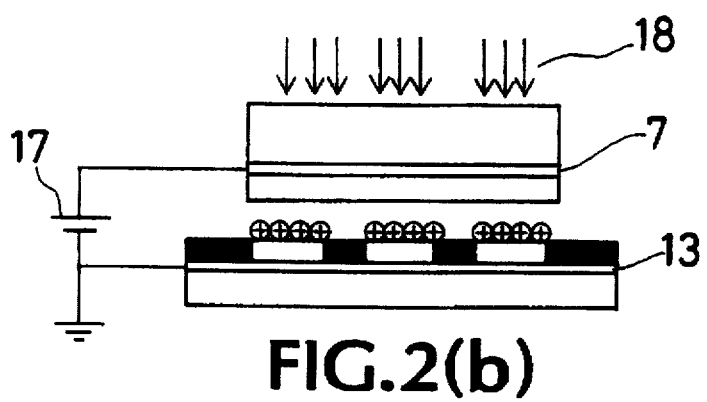
Figure 2C:
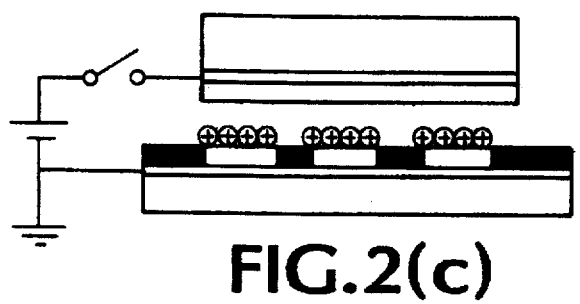
Figure 2D:
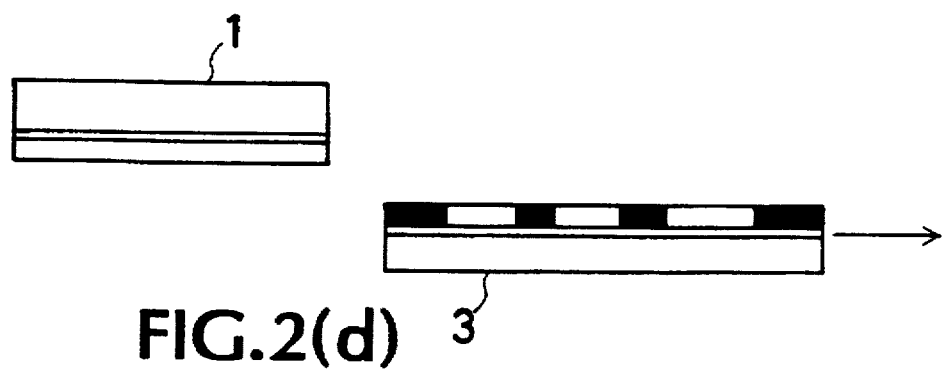

Next, a voltage is applied between the electrodes 7 and 13 from the power source 17, as shown in FIG. 2(b). If this is done in the dark, the photoconductive layer 9 is a high resistance element. If light 18 is applied from the photosensitive member side in this state, a portion of the photoconductive layer 9 where the light is incident becomes electrically conductive and hence a low resistance element, so that an atmospheric discharge occurs in this region, thus causing a strong electric field to act on the information recording layer. As a result, the molecular alignment in the liquid crystal dispersed in the resin material is altered, thus enabling the applied information light to be recorded as a visible image. It should be noted that it is also possible to apply information light for exposure at a predetermined timing after the voltage application. After the recording operation, the power source 17 is turned off, as shown in FIG. 2(c), and the information recording medium 3 is separated from the photosensitive member 1, as shown in FIG. 2(d).

In a case where a smectic liquid crystal is dispersed in the resin material, the memory effect is particularly good, so that even after the removal of the electric field, the modulated molecular alignment is maintained as it is; even if the information recording medium is left to stand for a long time, the recorded information can be read. Since the recorded visible image can be erased by heating the information recording medium to a temperature near the isotropic phase transition temperature, the information recording medium can be reused.

In addition, since the operating voltage and its range differ among liquid crystals, when the level of applied voltage and voltage application time are to be set for formation of information electric charge, it is preferable to properly set the voltage distribution among the photosensitive member, the air gap and the information recording medium so that the voltage distributed to the information recording layer will fall in the operating voltage region of the liquid crystal used.

Figure 3:
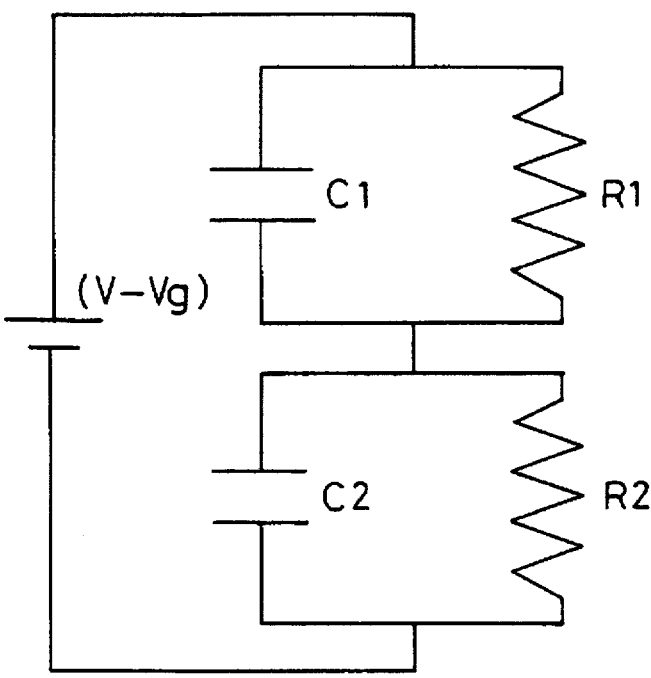
FIG. 3 is a diagram showing an equivalent circuit.

Incidentally, when the resistance and capacitance of the photosensitive member are represented by R1 and C1 and those of the information recording medium by R2 and C1, the arrangement shown in FIGS. 2(a)–2(d) may be represented by an equivalent circuit such as that shown in FIG. 3, in which the impedances of the photosensitive member and the information recording medium are connected in series and a voltage obtained by subtracting the air gap discharge voltage Vg from the power supply voltage V, i.e., (V−Vg), is applied across the series-connected impedances because in the exposed regions electric discharge occurs at the air gap and hence the air gap resistance can be ignored. Therefore, if a step-shaped voltage is applied between the photosensitive member and the information recording medium in the arrangement shown in FIGS. 2(a)–2(d) by turning on the power supply 17, the voltage distribution to the photosensitive member and the information recording medium immediately after the starting of the voltage application is determined by the ratio between the reciprocals of the capacitances C1 and C2. For example, if the capacitance of the information recording medium is about 4 times that of the photosensitive member, about ⅕ of the applied voltage is applied to the liquid crystal layer. As time passes, the capacitances C1 and C2 are charged, and the voltage distribution to the photosensitive member and the information recording medium is eventually determined by the ratio between the resistances R1 and R2. Thus, the voltage that is applied to the photosensitive member shows characteristics represented by the curve A, while the voltage applied to the liquid crystal layer shows characteristics represented by the curve B, as shown exemplarily in FIG. 4.

Figure 4:
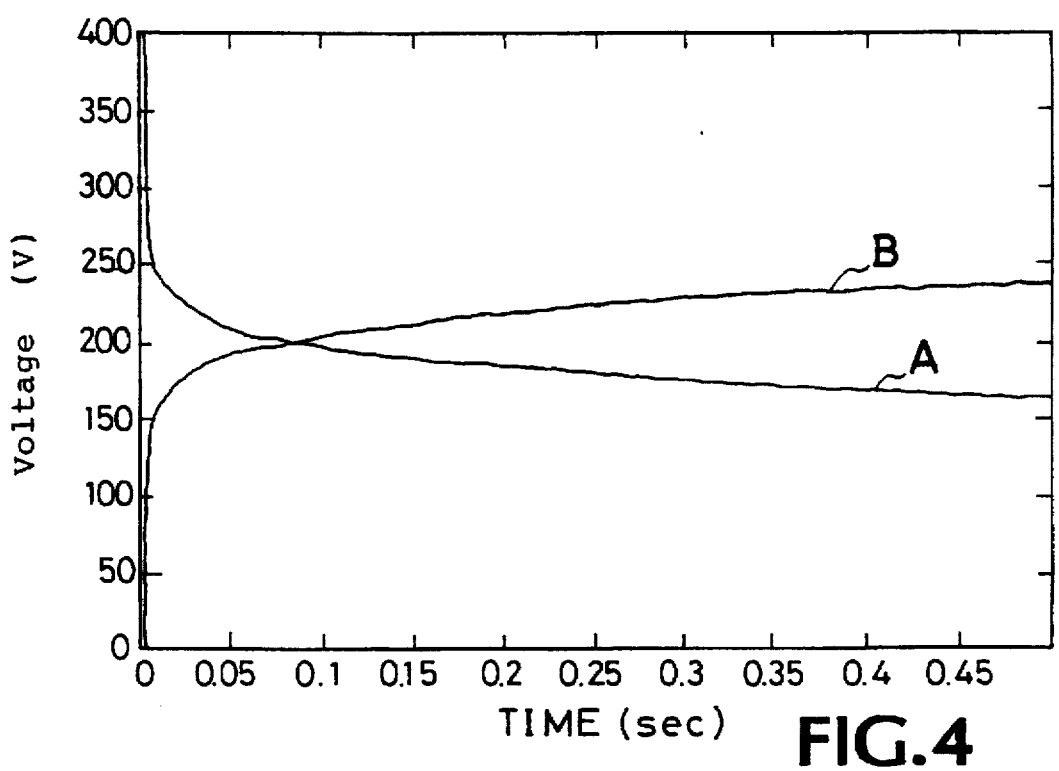
FIG. 4 is a graph showing voltages applied to a photosensitive member and a liquid crystal, respectively.

However, since the resistance R2 of the liquid crystal layer is not very high, the voltage that is eventually applied to the liquid crystal layer cannot be raised to a high level, and hence the degree of modulation cannot be raised to a high level. In addition, the voltage rising curve has an extremely gentle slope, as shown in FIG. 4, so that it takes a long time to reach a state where the difference between the voltage applied to the liquid crystal layer and the dark potential at the unexposed regions is sufficiently large, which is the most suitable for information recording. Accordingly, the response is not good. One approach to solve this problem may be to raise the power supply voltage. However, if a power supply voltage is set to a level at which the voltage that is initially distributed to the information recording medium exceeds the threshold value of the liquid crystal, the molecular alignment in the liquid crystal will be modulated independently of the information to be recorded. Thus, the power supply voltage cannot be raised without limit. To solve this problem, the voltage is applied in such a manner that even if the voltage that is initially applied to the liquid crystal is low, a high voltage is eventually applied thereto, thereby raising the degree of modulation of the liquid crystal, and thus improving the contrast. By doing so, it is also possible to improve the response. That is, it is preferable to gradually increase the voltage that is applied between the two electrodes in the arrangement shown in FIG. 2(b).

The method of recording information on the information recording medium enables planar analog recording and makes it possible to obtain recording at the liquid crystal particle level and hence high resolution, and it also permits the exposure light pattern to be retained in the form of a visible image by the molecular alignment in the liquid crystal phase. To input information, a method that uses a high-resolution electrostatic camera or a recording method that uses laser may be employed. Information light may be applied from either the photosensitive member side or the information recording medium side. The high-resolution electrostatic camera uses a recording member which comprises a photosensitive member 1 and an information recording medium 3 in place of a photographic film used in an ordinary camera. Either an optical or electric shutter can be used for this camera.

It is also possible to conduct color photography by using a color filter by which light information is separated into R, G and B light components and taken out in the form of parallel rays through prisms, and forming one frame from the information recording medium separated into R, G and B light components or from one set of R, G and B images arranged on one plane.

In the recording method by laser, argon laser (514 nm, 488 nm), helium-neon laser (633 nm) or semiconductor laser (780 nm, 810 nm, etc.) may be used as a light source. The photosensitive member and the information recording medium are brought into close contact with each other at their surfaces or they are placed so as to face each other at a predetermined distance, and a voltage is applied thereto. Under such conditions, laser exposure corresponding to an information signal, character signal, code signal or line drawing signal is performed by scanning. Analog recording such as recording of information is effected by modulating the intensity of laser light, whereas digital recording such as recording of characters, code or line drawing is effected by on/off control of laser light. Information that consists of halftone dots is formed by on/off controlling laser light through a dot generator. It should be noted that the photoconductive layer in the photosensitive member need not have panchromatic spectral characteristics, but it is only required to have sensitivity to the wavelength of the laser light source employed.

Information recording can also be effected by a method wherein a voltage is applied by corona charge or using stylus electrodes or pattern electrodes in a contact or non-contact state, in place of the photosensitive member, or a method wherein information recording is effected by an ion-deposition printer that uses an ion head.

Information that is recorded by the molecular alignment in the liquid crystal is visible information which can be read by visual observation, and it can also be read in the form of an enlarged image by using a reflecting projector. If laser scanning or CCD is used to read the recorded information by reflected light or transmitted light, the information can be read with high accuracy.

Next, the second information recording medium will be explained.

Figure 5:
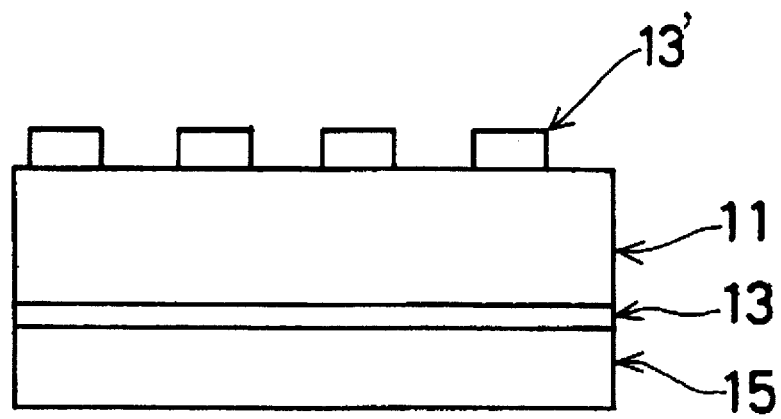
FIG. 5 is a sectional schematic view of the second information recording medium according to the present invention.

FIG. 5 is a sectional view of the second information recording medium according to the present invention. In the figure, reference numeral 13' denotes an electrode layer, and the same reference numerals as those in FIG. 1 denote the same contents.

The second information recording medium is formed by providing a patterned electrode layer 13' on the surface of the information recording layer of the first information recording medium. The electrode layer 13' can be formed by using a material selected from among those mentioned for the above-described electrode layer 13. It is preferable to provide a transparent electrode layer, for example, ITO layer, by sputtering or vapor deposition.

In general, if a film is formed from a mixture of a curable resin and a liquid crystal by curing the resin, the liquid crystal oozes out on the surface of the film, so that if ITO, for example, is stacked on the film by sputtering or vapor deposition, the ITO film will be cracked, resulting in a lowering of the electrical conductivity.

In the second information recording medium, a skin layer that comprises only an ultraviolet curing resin material is present on the surface of the information recording layer, and there is therefore no possibility of the liquid crystal oozing out. Accordingly, even if ITO, for example, is provided directly on the surface of the information recording layer by vacuum deposition, the electrode layer will not be cracked, and there is no likelihood that the electrical conductivity will lower. In addition, the heat resistance and sputtering resistance can be improved. Since the electrode layer is united with the information recording layer, the gap between the two electrode layers can be made uniform in comparison to the first information recording medium.

Recording of information on the second information recording medium is effected by aligning the molecules in the liquid crystal layer at the regions where the electrodes 13' are present by applying a voltage between the electrode layers 13 and 13'. The arrangement may be such that the electrode layers 13 and 13' are formed in a matrix to record information in a pattern by controlling the applied voltage. The arrangement may also be such that electrodes 13 and 13' are uniformly provided on both sides of the information recording layer, and with a low voltage applied between the electrodes 13 and 13', the information recording layer is heated in a pattern by using laser light or the like so that the operating voltage at the heated regions is lowered to a level substantially equal to the applied voltage, thereby recording the pattern of the laser light. When transmitted light, for example, is used for reproduction of the recorded information, in the information recording region light is transmitted, whereas in the region where no information has been recorded light is scattered, thus presenting a contrast with the information recording region.

Next, the third information recording medium of the present invention will be explained.

Figure 6:
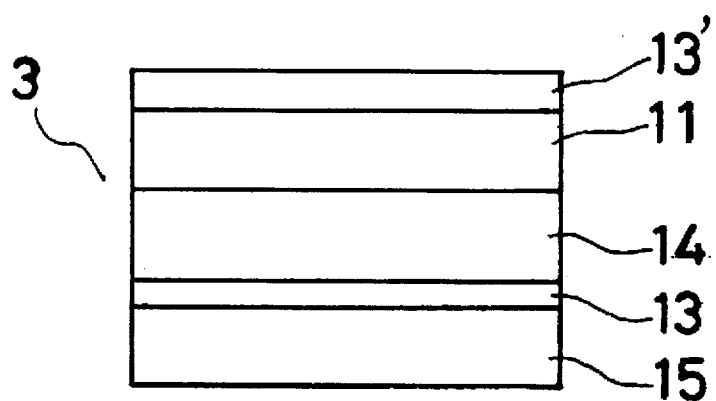
FIG. 6 is a sectional schematic view of the third information recording medium according to the present invention.

FIG. 6 is a schematic sectional view of the third information recording medium according to the present invention. In the figure, reference numeral 3 denotes an information recording medium, 11 an information recording layer, 13, 13' electrode layers, 14 a photoconductive layer, and 15 a substrate.

As shown in the figure, the third information recording medium comprises a photoconductive layer 14, an information recording layer 11 and an electrode layer 13', which are successively stacked on an electrode layer 13. The electrode layers 13 and 13' are formed on a substrate 15 which is similar to the substrate 15 in the above-described first and second information recording mediums in the same way as in the described mediums. Either or both of the electrode layers 13 and 13' are required to be transparent.

The photoconductive layer 14 is an electrically conductive layer in which when light is applied, photocarriers (electrons or holes) are generated in the irradiated region and these carriers are movable across the width of the layer. This effect is particularly remarkable in the presence of an electric field. The following is a description of photoconductive materials and a method of forming a photoconductive layer.

(A) Examples of materials for a silicon photoconductive layer include (1) silicon which is in the form of a simple substance and (2) silicon which is doped with impurities [materials which are doped with B, Al, Ga, In, Tl or the like so as to be of P-type (hole transport type), and those which are doped with P, Ag, Sb, Bi or the like so as to be of N-type (electron transport type)]. The silicon photoconductive layer may be formed in such a manner that silane gas and an impurity gas are introduced into a low-vacuum atmosphere ($10^{-2}$ to 1 Torr) together with hydrogen gas, for example, and then deposited by glow discharge on an electrode substrate, either heated or not heated, to form a film. The silicon photoconductive layer may be formed merely on a heated electrode substrate by a thermochemical reaction. Alternatively, a solid material may be subjected to vapor deposition or sputtering to form a film. The silicon photoconductive layer may be used in the form of a single layer or a stack of layers. The thickness of the photoconductive layer may be 1 μm to 50 μm.

(B) Examples of materials for a selenium photoconductive layer include (1) selenium which is in the form of a simple substance, (2) selenium tellurium, (3) arsenic selenium compound ($As_2Se_3$), and (4) arsenic selenium compound+Te. A photoconductive layer of these compounds may be formed by vapor deposition or sputtering. It is also possible to form a laminated photoconductive layer by combining the materials (1) to (4). The thickness of the selenium photoconductive layer may be the same as that of the silicon photoconductive member.

(C) A cadmium sulfide (CdS) photoconductive layer may be formed by coating, vapor deposition or sputtering. In the case of vapor deposition, solid particles of CdS are placed on a tungsten board and vapor-deposited by resistance heating or by EB (electron beam) vapor deposition. In the case of sputtering, CdS is deposited on a substrate in argon plasma by use of a CdS target. In this case, CdS is usually deposited in an amorphous state but a crystalline oriented film (oriented in the direction of the film thickness) can also be obtained by selecting sputtering conditions. In the case of coating, it is preferable to disperse CdS particles (particle diameter: 1 μm to 100 μm) into a binder, add a solvent to the resulting dispersion and coat the solution over a substrate.

(D) A zinc oxide (ZnO) photoconductive layer may be formed by coating or chemical vapor deposition (CVD). In the case of coating, ZnO particles (particle diameter: 1 μm to 100 μm) are dispersed into a binder, a solvent is added to the resulting dispersion, and the resulting solution is coated on a substrate. In the case of CVD, an organic metal such as diethylzinc or dimethylzinc and oxygen gas are mixed together in a low vacuum ($10^{-2}$ to 1 Torr) and then chemically reacted with each other on a heated electrode substrate (150° C. to 400° C.), thereby depositing a zinc oxide film thereon. In this case also, a film which is oriented in the direction of the film thickness is obtained.

(E) An organic photoconductive layer may be either a single-layer photoconductive layer or a laminated photoconductive layer. The single-layer photoconductive layer is formed by stacking a mixture of a charge generating substance and a charge transport substance on the electrode. The laminated photoconductive layer has a charge generation layer and a charge transport layer, which are stacked successively on the electrode.

The organic photoconductive layer is formed by the same method as in the case of the photoconductive layer in the photosensitive member, set forth in the section describing the information recording and reproducing method for the first information recording medium.

Then, an information recording layer 11 is stacked on the photoconductive layer 14 in the same way as in the case of the information recording layer in the first information recording medium.

Next, an electrode layer 13' is provided on the information recording layer 11 by the same method as that used to form the above-described electrode layer 13, using the same material as that for the electrode layer 13. Since a skin layer is formed on the surface of the information recording layer 11, an ITO film, for example, can be stacked thereon by vapor deposition, sputtering or the like without cracking. Thus, there will be no lowering in the electrical conductivity. If necessary, a substrate which is similar to the above or a transparent protection layer may be stacked on the electrode layer 13'.

Next, the fourth information recording medium will be explained.

Figure 7:
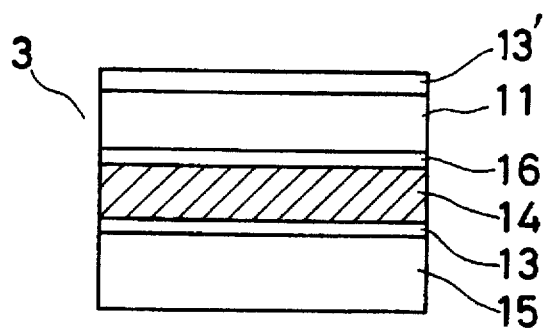
FIG. 7 is a sectional schematic view of the fourth information recording medium according to the present invention.

FIG. 7 is a sectional view of the fourth information recording medium. In the figure, reference numeral 16 denotes either a transparent insulating layer or a transparent semiconductor layer, and the same reference numerals as those in FIG. 6 denote the same contents.

In the fourth information recording medium, either a transparent insulating layer or a transparent semiconductor layer is provided in between the photoconductive layer and the information recording layer in the third information recording medium. This information recording medium is particularly suitable for an arrangement in which the photoconductive layer is an organic photosensitive layer formed by using a solvent. The transparent insulating or semiconductor layer is provided for the purpose of preventing unevenness of recorded information which might otherwise be caused by elution of the liquid crystal from the information recording layer by the interaction between the photoconductive layer and the information recording layer, or elution of the photoconductive material by a solvent used for forming the information recording layer on the photoconductive layer by coating.

Accordingly, the material for forming the transparent insulating or semiconductor layer needs to be incompatible with either of the materials for forming the organic photoconductive layer and the information recording layer. If the material is electrically conductive, the space charge is diffused, causing deterioration of the resolution; therefore, insulating or semiconducting properties are required. However, since the transparent insulating or semiconductor layer lowers the voltage distributed to the liquid crystal layer or degrades the definition, it is preferable for the layer thickness to be as small as possible, preferably 2 μm or less. On the other hand, reduction in the layer thickness gives rise to not only generation of information noise due to the interaction that progresses with the passage of time but also the problem of permeation due to defects such as pinholes at the time of coating the material for laminating. Since the permeability depends on the proportion of the solid content of the material to be coated for laminating, the kind of solvent used and the viscosity, the layer thickness is properly set in accordance with the material which is to be coated. To prevent the occurrence of these problems, the following materials may be used in a laminated form. When the voltage distribution to each layer is taken into consideration, it is preferable to use a material having a high dielectric constant as well as to minimize the layer thickness.

Figure 8:
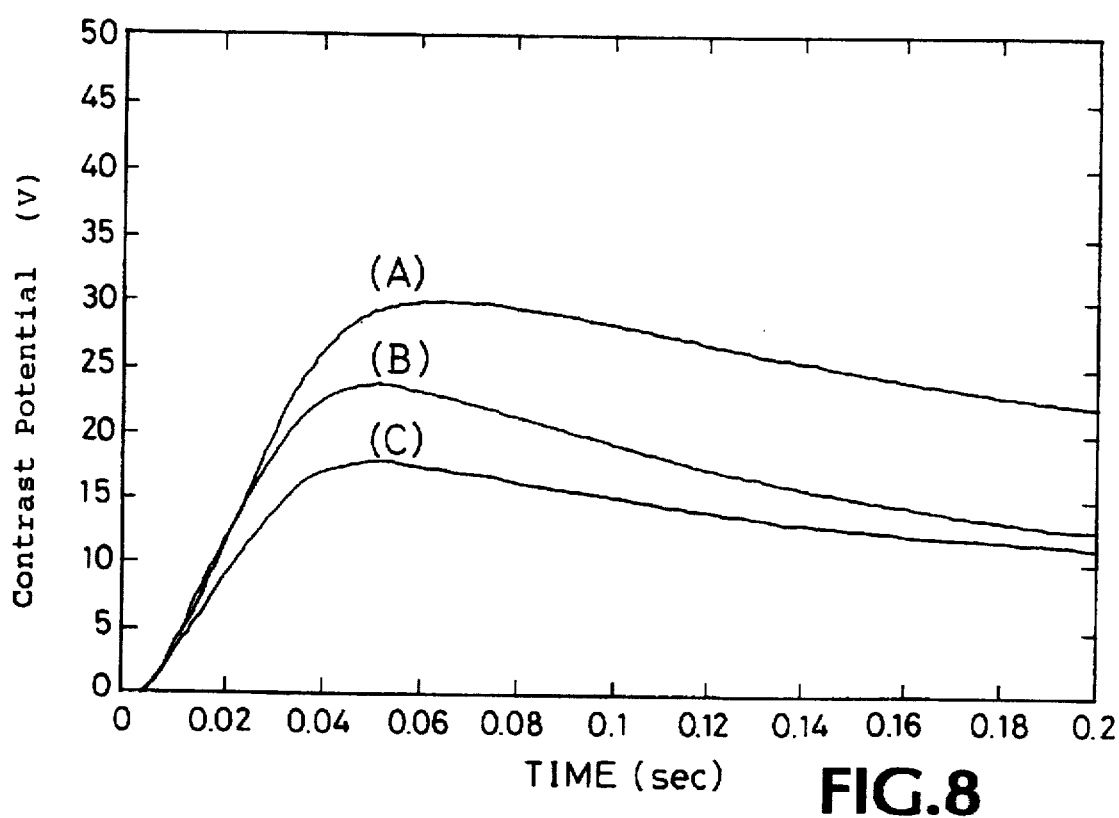
FIG. 8 is a graph for illustrating the effect on the contrast potential that is produced by an intermediate layer when provided in the fourth information recording medium.

FIG. 8 is a graph showing the results of actual experiments. The graph shows a comparison as to the change of the contrast potential (light potential—dark potential) with the passage of time among an information recording medium (A) with no intermediate layer, an information recording medium (B) that uses an intermediate layer with a dielectric constant of 3.0, and an information recording medium (C) that uses an intermediate layer with a dielectric constant of 2.1.

As will be understood from the graph, the highest contrast potential is obtained with the information recording medium (A) that has no intermediate layer, as a matter of course, and the difference in the dielectric constant of the intermediate layer produces a difference between the contrast potentials obtained.

For example, the transparent insulating layer of these intermediate layers may be formed by depositing an inorganic material, e.g., $SiO_2$, $TiO_2$, $CeO_2$, $Al_2O_3$, $GeO_2$, $Si_3N_4$, AlN, TiN, etc., by vapor deposition, sputtering, chemical vapor deposition (CVD), etc. It is also possible to use an aqueous solution of polyvinyl alcohol, water-system polyurethane, water glass, etc. as a water-soluble resin material which is less compatible with an organic solvent and to coat such an aqueous solution by spin coating, blade coating, roll coating and so forth. Further, a coatable fluorocarbon resin may also be used; in such a case, it may be dissolved in a fluorine-containing solvent and coated by spin coating or stacked by blade coating, roll coating, etc.

Coatable fluorocarbon resins which are preferable to use include a fluorine-containing thermoplastic resin consisting of a repeating unit of a ring structure represented by the formula:

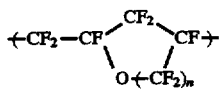

and/or the formula:

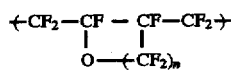

(where n is 1 or 2)
the fluorine-containing thermoplastic resin having such a molecular weight that the intrinsic viscosity at 50° C. is at least 0.1, and a fluorine-containing thermoplastic resin consisting of a repeating unit (a) of a ring structure represented by the formula:

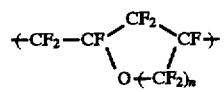

and/or the formula:

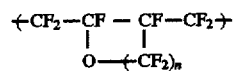

(where n is 1 or 2)
and a repeating unit (b) represented by the formula:

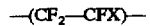

(where X is F, Cl, $-O-CF_2CF_2CF_3$, $-O-CF_2CF(CF_3)OCF_2CF_2SO_3F$, or $-O-CF_2CF_2CF_2COOCH_3$)
the fluorine-containing thermoplastic resin containing at least 80% by weight of repeating unit (a) and having such a molecular weight that the intrinsic viscosity at 50° C. is at least 0.1.

The repeating unit (a) is obtained by radical cyclopolymerization of a perfluoroarylvinyl ether or perfluorobutenylvinyl ether represented by the formula:

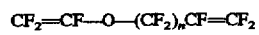

(where n is 1 or 2)
A fluorine-containing thermoplastic resin that contains both the repeating units (a) and (b) is obtained by radical polymerization of a perfluorovinyl ether represented by the formula:

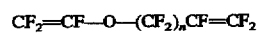

(where n is 1 or 2)
and a monomer represented by the formula:

(where X is F, Cl, $-O-CF_2CF_2CF_3$, $-O-CF_2CF(CF_3)OCF_2CF_2SO_3F$, or $-O-CF_2CF_2CF_2COOCH_3$)
These resins are disclosed, for example, in Japanese Patent Application Laid-Open (KOKAI) No. 01-131215.

Further, it is possible to use a fluorine-containing thermoplastic resin that consists of a repeating unit represented by

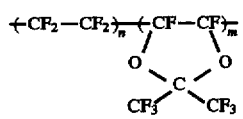

(where the content of the dioxonol component represented by the number m of repeating units is in the range of 20 mol % to 90 mol %)
the fluorine-containing thermoplastic resin having a melt viscosity of $10^2$ to $10^4$ Pa.sec at a temperature which is 90° C. to 110° C. higher than the glass transition temperature. Specific examples of such a fluorine-containing thermoplastic resin are "Teflon" AF1600 (trade name), manufactured by Du Pont Co., Ltd., containing about 65 mol % dioxonol unit and having a glass transition temperature of 160° C., a melt viscosity of 2657 Pa.sec (measured by ASTM D3835 at 250° C. and 100 $sec^{-1}$) and a water absorption of 0.01% or less, and "Teflon" AF2400 (trade name), manufactured by Du Pont Co., Ltd., containing about 85 mol % dioxonol unit and having a glass transition temperature of 240° C., a melt viscosity of 540 Pa-sec (measured by ASTM D3835 at 350° C. and 100 sec$^{-1}$) and a water absorption of 0.01% or less.

It should be noted that fluorocarbon resins usable in the present invention are not necessarily limited to perfluororesins, but any fluorocarbon resin which is only slightly soluble in a general-purpose solvent and which is soluble in a fluorine-containing solvent can be used. When a coating type transparent insulating material is to be selected, it is necessary for a solvent therefor not to dissolve the photoconductive layer and not to dissolve in a material constituting the information recording layer when formed by coating or in a solvent used for the material when coated.

In the case of an organic material that is formed into a film in a vacuum system, there is no likelihood that it will dissolve the photoconductive layer during the film forming process. Examples of materials usable for film formation by vapor deposition include polyethylene, polypropylene, poly (monochlorotrifluoroethylene), polytetrafluoroethylene, etc. In addition, as materials usable for film formation by CVD, polyparaxylylenes of the following structural formulae can be used:

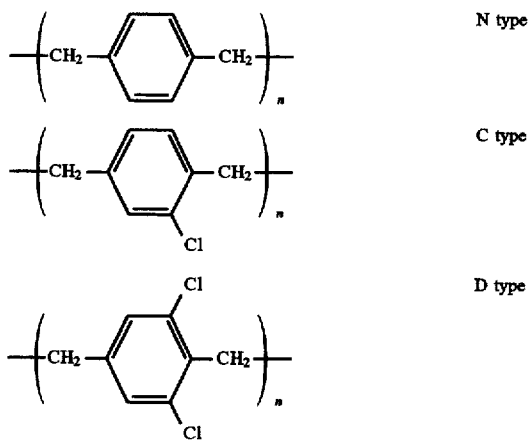

(It should be noted that the above Type C is not limited to substances of the above structure but includes substances in which one of the sites other than the main chain bonding sites in the benzene ring is substituted by chlorine and that Type D includes substances in which two of said sites are substituted by chlorine.)

It should be noted that when the photoconductive layer is formed from an inorganic material and hence there is no interaction with the information recording layer, e.g., oozing of the liquid crystal, no transparent insulating layer is needed.

It is also possible to use a dielectric mirror layer in place of the transparent insulating layer or transparent semiconductor layer to thereby read the information recorded in the information recording layer by using reflected light. Examples of such a dielectric mirror layer include a layer formed by alternately stacking a magnesium fluoride layer and a zinc sulfide layer.

The third and fourth information recording mediums of the present invention are also designed to record electrostatic information in a visible form by virtue of the molecular alignment in the liquid crystal. By properly selecting a combination of a liquid crystal and a resin material, these information recording mediums are endowed with the memory effect that makes it possible to retain information that has once been recorded in a visible form by the liquid crystal alignment. The recorded information can be erased by heating the medium to a high temperature near the isotropic phase transition temperature. Thus, the medium can be reused for information recording.

Figure 9A:
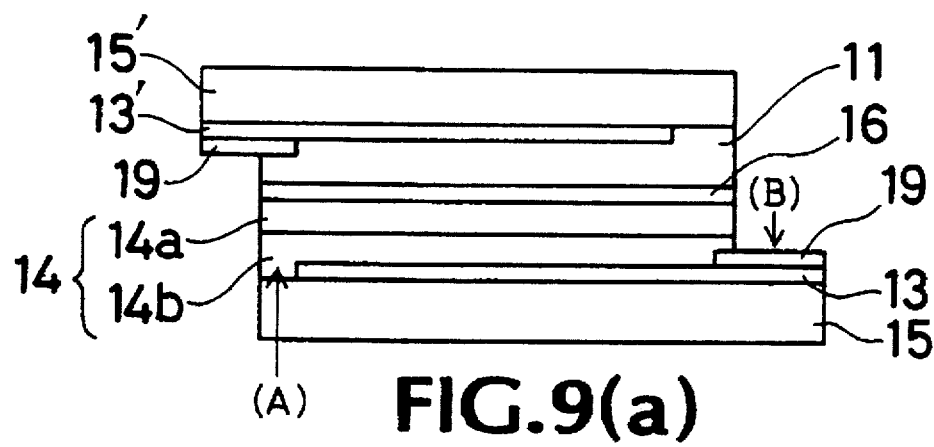
FIGS. 9(a) and 9(b) are sectional schematic view of the fifth information recording medium according to the present invention.
Figure 9B:
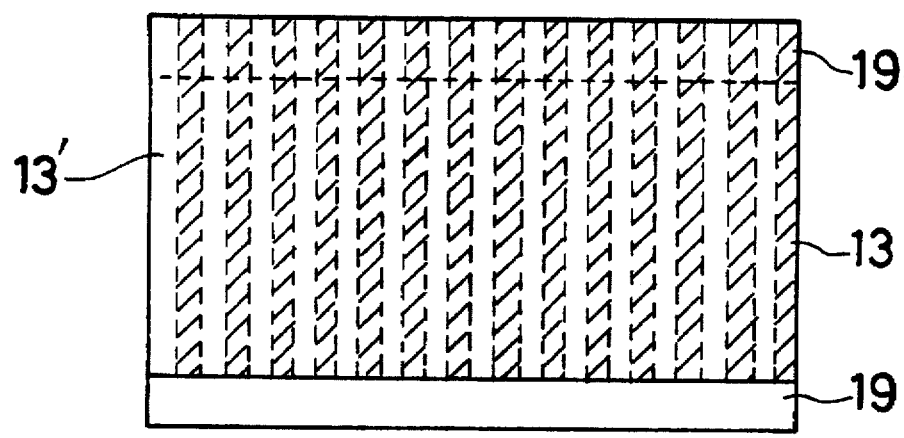

The fifth information recording medium of the present invention relates to a card type information recording medium which is formed by arranging the third or fourth information recording medium in the shape of a card. The card configuration may be either a disk-shaped configuration or a film-shaped configuration. FIG. 9(a) is a sectional view of a card type information recording medium formed by using the arrangement of the fourth information recording medium. FIG. 9(b) is a plan view of the card type information recording medium. It should be noted that a card type information recording medium may similarly be formed by using the arrangement of the third information recording medium. In the figures, reference numerals 15 and 15' denote base films, 13 a common electrode, 13' an area selecting electrode, and 19 contact reinforcing electrodes. The other reference numerals denote the same contents as those in FIG. 7. It should be noted that in the arrangement shown in FIGS. 9(a) and 9(b), the electrode layers 13 and 13' may be used as an area selecting electrode and a common electrode, respectively.

As shown in FIGS. 9(a) and 9(B), in the fifth information recording medium of the present invention, one electrode layer 13 is used as a common electrode, while another electrode layer 13' is used as an area selecting electrode, and the contact reinforcing electrodes 19 are provided for the respective electrodes 13 and 13' such that each contact reinforcing electrode 19 extends along one edge of the associated base film with a predetermined width.

In the fifth information recording medium, a desired memory area can be selected by applying a voltage between the common electrode and the area selecting electrode corresponding to the memory area to be selected. Thus, it is possible to write various kinds of information in respective areas: for example, a color image in one area; a monochromatic image in another area; and digital data in still another area. Accordingly, it is possible to improve the utility of the information recording medium.

Figure 11:
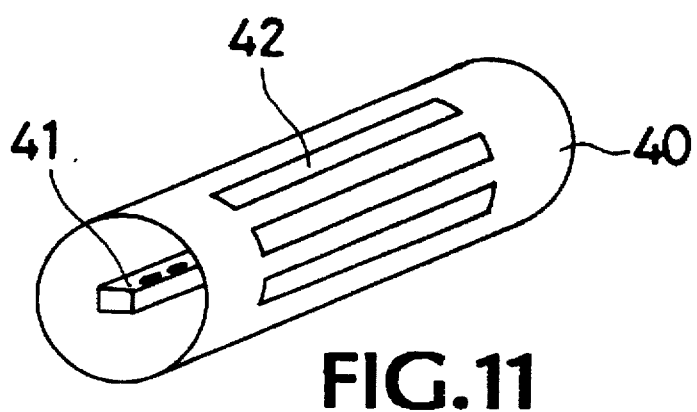
FIG. 11 illustrates one example of a method of forming an area selecting electrode.

FIGS. 10(a)–10(f) show a method of producing the fifth information recording medium. FIG. 11 shows one example of a method of forming an area selecting electrode.

Figure 10A:
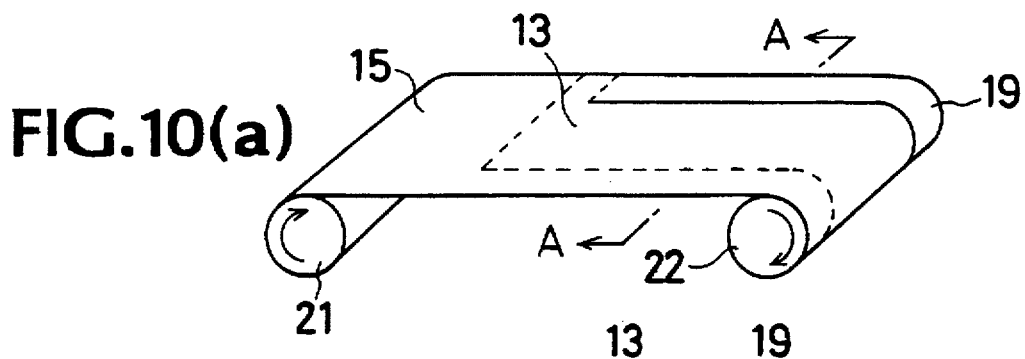
FIGS. 10(a)–10(f) illustrate a method of producing the fifth information recording medium.
Figure 10B:
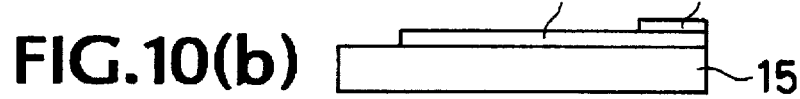

Referring first to FIG. 10(a), a base film 15 of transparent PET having a width of 54 mm and a thickness of about 188 μm, for example, is continuously supplied from a roller 21 and taken up on a roller 22. An ITO common electrode 13 is formed in a pattern on the base film 15, which is continuously supplied, by sputtering or other similar process. At the same time, a metal 19 for contact reinforcement is formed in a pattern on the ITO transparent electrode 13 along one edge of the base film 15 by evaporation. Although in the figure the transparent common electrode 13 is formed so as not to extend as far as the edge opposite to the contact electrode 19, it may be formed over the whole surface of the base film 15. FIG. 10(b) is a sectional view of the base film 15 taken along the line A—A in FIG. 10(a). Next, as shown in FIG. 10(c), a photoconductive layer 14, which comprises a charge generation layer 14b and a charge transport layer 14a, and an intermediate layer 16 comprising a transparent insulating layer are successively stacked on the base film 15, which is formed with the transparent electrode 13, such that the contact electrode 19 is exposed.

Figure 10C:
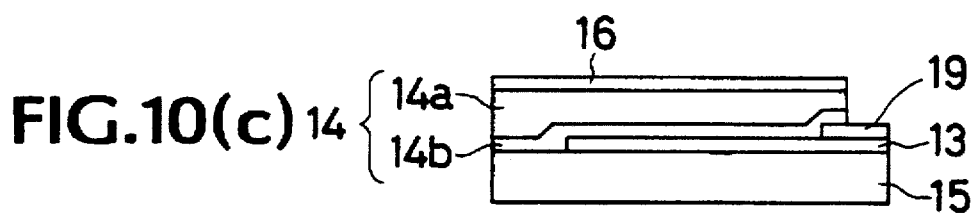
Figure 10D:
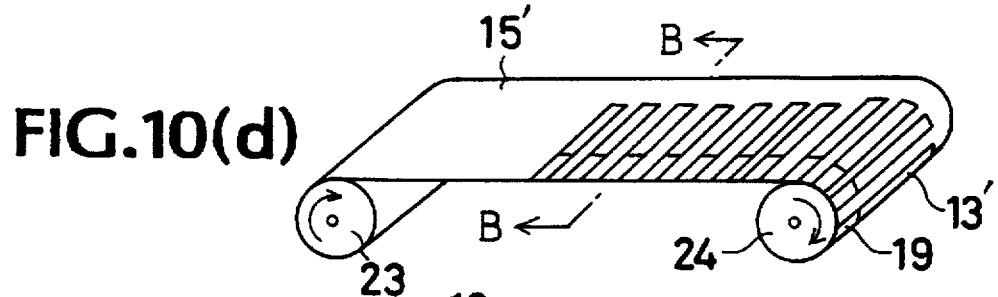
Figure 10E:
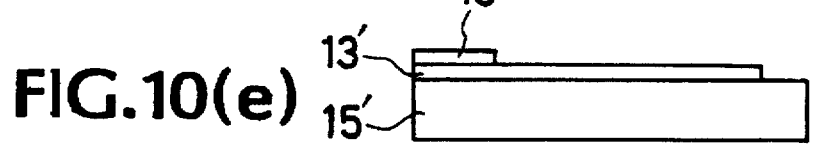

In the meantime, as shown in FIG. 10(d), a base film 15' of PET having the same width and substantially the same thickness as those of the base film 15 is continuously supplied from a roller 23 and taken up on a roller 24, and while doing so, an area selecting electrode 13' of ITO is continuously formed. The area selecting electrode 13' comprises a plurality of belt-shaped electrodes extending from one edge toward the other edge of the base film 15'. A metal 19 for contact reinforcement is formed on the root portion of each belt-shaped area selecting electrode by evaporation. FIG. 10(e) is a sectional view of the base film 15' taken along the line B—B in FIG. 10(d).

Figure 10F:
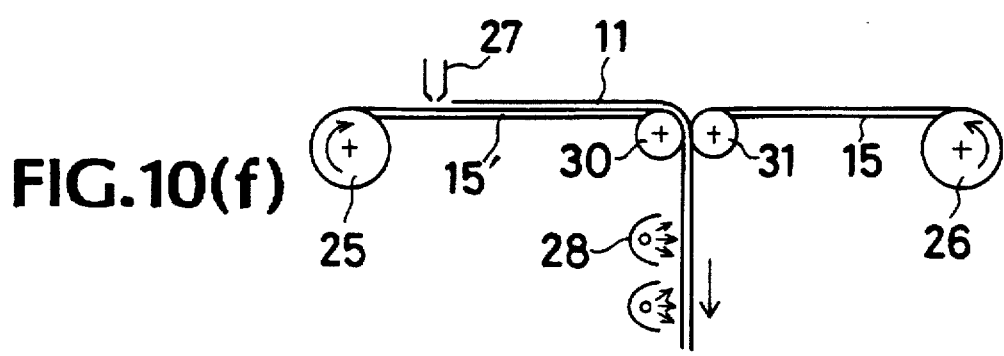

The base film 15, which is formed with the transparent common electrode, the photoconductive layer and the transparent insulating layer as shown in FIG. 10(c), and the base film 15', which is formed with the area selecting electrode as shown in FIG. 10(e), are sequentially supplied, as shown in FIG. 10(f), and while doing so, an information recording layer forming material comprising a liquid crystal dispersed in an ultraviolet curing material is continuously coated on the base film 15' from a feeding device 27, as shown by reference numeral 11 in the figure. Then, the two films 15 and 15' are butted against each other, with their respective electrode sides opposed to each other, by a pair of rollers 30 and 31, thereby sandwiching the liquid crystal layer between the films 15 and 15'. In this state, ultraviolet rays are applied to the films 15 and 15' from an ultraviolet irradiator 28 to cure the resin material.

After the resin material has been cured, the resulting information recording medium is cut into a predetermined length. In this way, a card type liquid crystal recording medium such as that shown in FIGS. 9(a) and 9(b), which are sectional and plan views, respectively, is continuously produced. Although in the arrangement shown in FIG. 10(f) the liquid crystal layer is coated on the base film 15', it may be coated on the film 15.

The area selecting electrode may be formed as follows. As shown in FIG. 11, a drum 40 is formed with a plurality of belt-shaped openings 42, and an evaporation source 41 is disposed in the drum 40. The base film 15 is sequentially supplied while being wound on the drum 40, thereby forming the area selecting electrode and the contact electrode by evaporation.

A disk- or film-shaped liquid crystal recording medium can be produced by a method similar to that for the card-shaped liquid crystal recording medium.

The fifth information recording medium of the present invention can also be produced by another method. The second method will be explained below by way of an example in which the electrode layer 13 in FIGS. 9(a) and 9(b) is used as an area selecting electrode, while the electrode layer 13' is used as a common electrode.

A transparent electrode layer of ITO or the like is formed on the whole surface of a transparent substrate 15 of a plastics, glass or other material by sputtering or other similar process. Next, the transparent electrode layer is masked in belt-shaped patterns by using vinyl chloride sheet with a region A exposed and then etched by using a mixed liquid of hydrochloric acid and nitric acid, thereby forming an area selecting electrode layer 13 comprising a plurality of belt-shaped transparent electrodes.

Further, a charge generation layer 14b and a charge transport layer 14a are successively coated on the area selecting electrode 13 in such a manner that a region B is exposed. Thereafter, a transparent insulating layer or transparent semiconductor layer 16 and an information recording layer 11 are successively formed on the photoconductive layer 14. Then, ultraviolet rays are applied to cure the information recording layer 11. It should be noted that the region B where the electrode is exposed may be formed by cutting an end portion of the stack structure after all the layers have been formed on the whole surface.

Since the information recording layer 11 is free from oozing of the liquid crystal or other problem, a common electrode 13' is formed on the whole surface of the information recording layer 11 by sputtering. A protective layer 15' is formed on the surface of the common electrode 13'. The protective layer 15' may be formed by coating. Alternatively, it may be produced in the form of a film in advance and stacked on the common electrode 13' through an adhesive layer, or the protective film 15' itself may be laminated on the common electrode 13'.

Thus, an ITO electrode is formed on the information recording layer which is free from oozing of the liquid crystal. Therefore, it is possible to produce continuously the fifth information recording medium which is capable of preventing damage to and deformation of the ITO electrode layer.

The information recording and reproducing method for the third and fourth information recording mediums will be explained below.

Figure 12A:
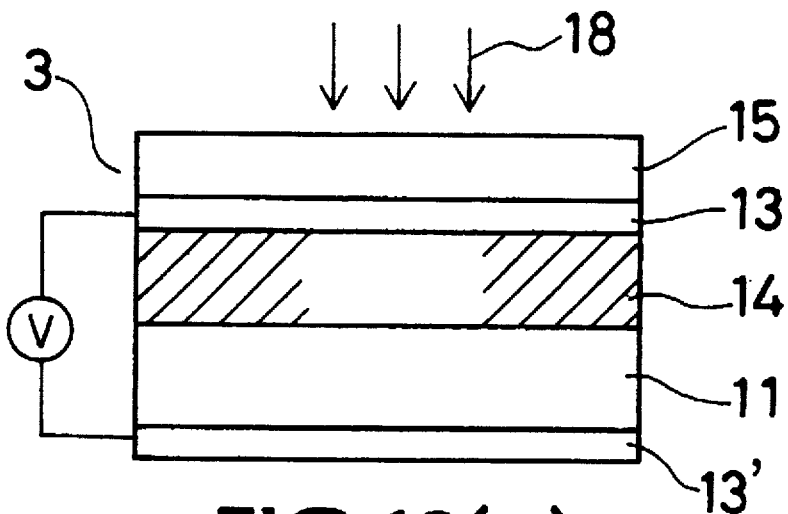
FIGS. 12(a) and 12(b) illustrate a method of recording information on the third to fifth information recording media according to the present invention.
Figure 12B:
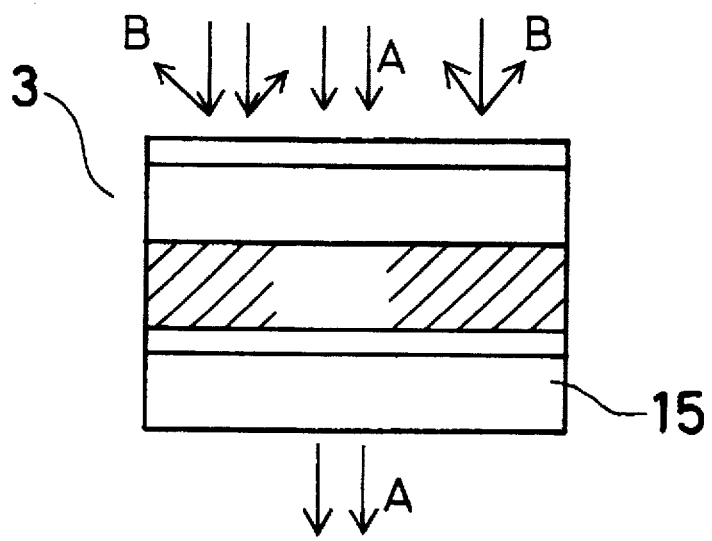

FIGS. 12(a) and 12(b) illustrate the method of recording information on the third information recording medium of the present invention. The method of recording information on the fourth information recording medium is similar to the method illustrated in FIGS. 12(a) and 12(b).

First, when information light 18 is incident on the information recording medium 3 with a voltage applied between the electrodes 13 and 13' from the power supply V, as shown in FIG. 12(a), photocarriers are generated in the photoconductive layer 14 at the region where the light is incident, and the photocarriers are moved by the electric field formed by the two electrodes 13 and 13', causing redistribution of the voltage. As a result, the molecules in the liquid crystal phase in the information recording layer are aligned in the pattern of information light 18, thereby recording the desired information. It should be noted that if the information recording medium is heated by a resistance heating element (not shown) buried in the substrate to heat the liquid crystal to a temperature at which it shows a liquid crystal phase when information is recorded on the information recording medium, the memory effect can be further improved. It is also possible to apply a voltage for a predetermined time with the voltage applied between the electrodes 13 and 13' and with the information light 18 applied to the medium 3.

In addition, since the operating voltage and its range differ among liquid crystals, when the level of applied voltage and voltage application time are to be set, it is preferable to properly set the voltage distribution in the information recording medium so that the voltage distributed to the information recording layer will fall in the operating voltage region of the liquid crystal used.

This information recording method also enables planar analog recording and makes it possible to obtain recording at the liquid crystal particle level and hence high resolution, and it also permits the exposure light pattern to be retained in the form of a visible image by the molecular alignment in the liquid crystal phase.

If the electrostatic information recorded on the information recording medium is reproduced by using transmitted light, as shown in FIG. 12(b), in the information recording region light A is transmitted because the liquid crystal molecules therein are aligned with the electric field, whereas in the region where no information is recorded light B is scattered, thus presenting a contrast with the information recording region. Information that is recorded by the molecular alignment in the liquid crystal is visible information which can be read by visual observation, and it can also be read in the form of an enlarged image by using a projector. If laser scanning or CCD is used to read the recorded information by reflected light or transmitted light, the information can be read with high accuracy. If necessary, a Schlieren optical system may be used to prevent scattered light. It is also possible to use reflected light to read the recorded information. When the contrast becomes a matter of great concern, it is preferable to provide a reflection layer on any layer in the information recording medium.

Examples will be explained below. In these Examples, the term "parts" means parts by weight, and "%" means percent by weight.

[EXAMPLE 1]

40 parts of a multifunctional monomer (dipentaerythritol hexaacrylate, M-400, manufactured by Toa Gosei Chemical Industry Co., Ltd.), 2 parts of a photo-curing initiator (2-hydroxy-2-methyl-1-phenylpropane-1-one, Darocure 1173, manufactured by Merck & Co., Inc.), 60 parts of a smectic liquid crystal (S-6, manufactured by BDH), and 3 parts of a surface-active agent (Fluorad FC-430, manufacture by Sumitomo 3M) were uniformly dissolved in 195 parts of xylene, and the resulting solution was coated by using a blade coater on the ITO film side of a glass substrate (1.1 mm in thickness) having an ITO film grown thereon to a thickness of about 2,000 Å by sputtering. The wet coating was dried for 3 minutes at 50° C. and then vacuum-dried for 3 minutes at 50° C. Immediately thereafter, the dry film was irradiated with ultraviolet rays at 300 mJ/cm$^2$ to cure the multifunctional monomer. The film thickness was 6 μm.

Figure 13:
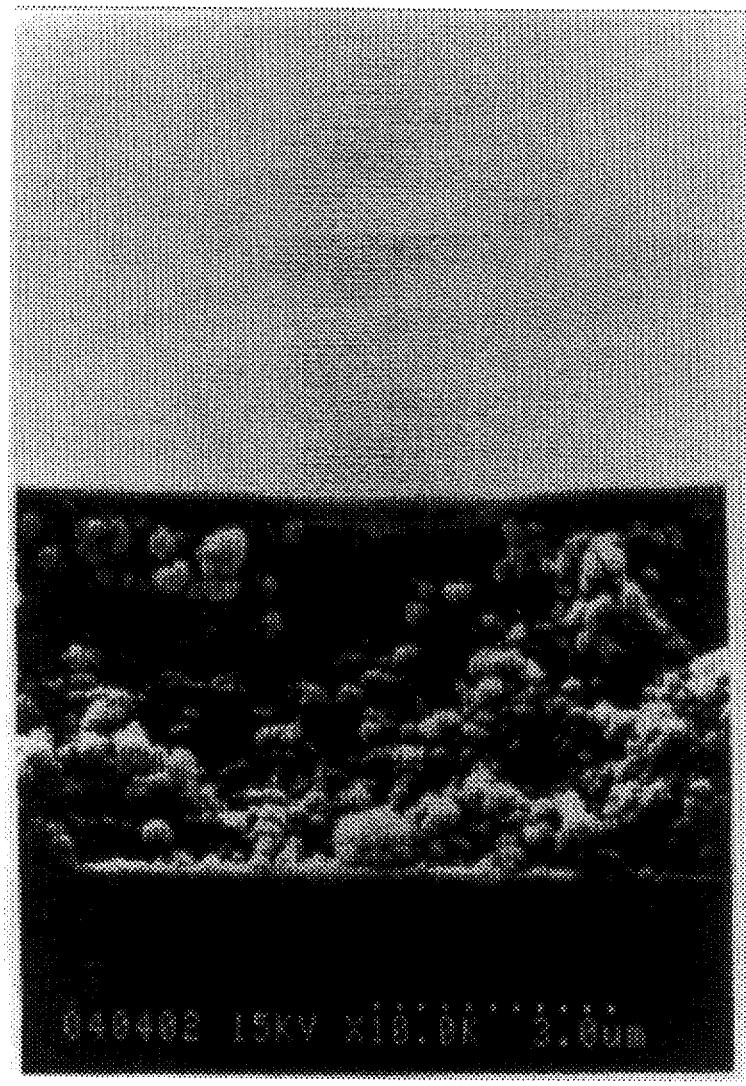
FIG. 13 is a photograph taken with a scanning electron microscope, showing the particle structure of the first information recording medium according to the present invention, in place of a drawing.

A cross-section of the information recording layer was dried after the liquid crystal was extracted with hot methanol, and then the internal structure of the information recording layer was observed with a scanning electron microscope having a magnifying power of 10,000 (S-800, manufactured by Hitachi, Ltd.). As a result, it was revealed that, as shown in FIG. 13, the surface of the information recording layer was covered with the ultraviolet curing resin material having a thickness of 0.6 μm and the inside of the layer had a structure in which the liquid crystal phase that formed a continuous layer was filled with the resin particle phase having a particle diameter of the submicron order.

Next, an ITO film was grown to a thickness of about 500 Å on the cured information recording layer by sputtering to form an upper electrode, thereby preparing an information recording medium according to the present invention.

Lead wires were attached to the two electrodes of the medium, and a DC voltage of 400 V was applied between the terminals of the electrodes for 0.1 sec. Before the application of the voltage, the transmittance of light of 633 nm was 40%, whereas after the voltage application, the transmittance was 80%. There was no oozing of the liquid crystal. The resistivity was as high as 10$^9$ ohm-cm/sq.

The transparent state was held for more than 1 year at room temperature. Thus, the information recording medium exhibited excellent memory properties. Next, the information recording medium which had already been subjected to the voltage application was placed on a hot plate at 60° C. for 10 sec., and immediately thereafter, the medium was cooled down to room temperature. In consequence, the whole medium returned to the scattering state before the voltage application without oozing of the liquid crystal, so that it became capable of being reused.

[EXAMPLE 2]

An information recording medium was prepared in the same way as in Example 1 except that a smectic liquid crystal (S1, manufactured by BDH) was used in place of the smectic liquid crystal (S-6, manufactured by BDH) used in Example 1 and 105 parts of xylene was used and that the wet coating was dried at 32° C. When the information recording medium was tested in the same way as in Example 1, it exhibited the same performance as the information recording medium in Example 1.

[EXAMPLE 3]

(Preparation of photosensitive member)

As a charge generating material, 3 parts of a bis-azo pigment represented by the structural formula:

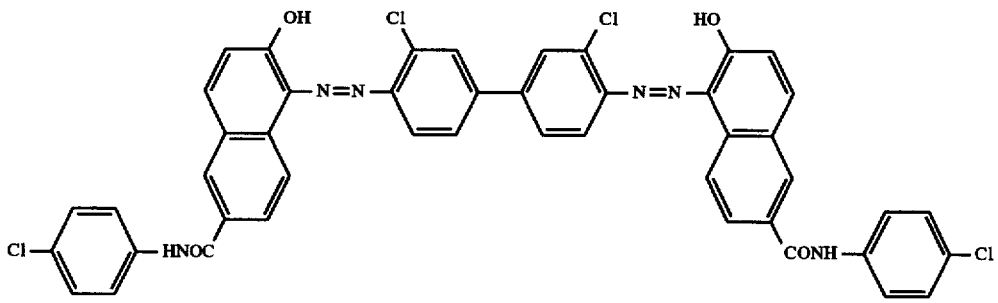

and 1 part of a polyvinyl acetal resin material were thoroughly dispersed in a ball mill with a mixed solvent comprising dioxane and cyclohexane in the ratio of 1:1 to prepare a 100 g solution in which the solid matter content was 2%, and the solution was coated on the ITO side of a glass substrate having an ITO transparent electrode (film thickness: about 500 Å; and resistance: 80 ohm/sq.) by using a blade coater having a gap of 2 mil and then dried for 1 hour at 100° C. to form a charge generation layer having a thickness of 0.3 μm.

Next, as a charge transport material, 15 parts of p-diethylaminobenzaldehyde-N-phenyl-benzylhydrazone and 10 parts of a polycarbonate resin material (Iupilon S-100, trade name; manufactured by Mitsubishi Gas Chemical Industries Ltd.) were mixed with a mixed solvent comprising dichloromethane and 1,1,2-trichloroethane in the ratio of 4:6 so that the solid matter content in the resulting solution was 17.8%, and the solution thus prepared was coated on the above-described charge generation layer with a blade coater having a gap of 2 mil and then dried for 2 hours at 80° C. to form a charge transport layer having a thickness of 10 μm, thus preparing an organic photosensitive member.

In the meantime, an information recording medium was prepared in the same way as in Example 1 except that it had no upper electrode. The information recording medium and the photosensitive member prepared as described above were disposed face-to-face with each other with a polyester film having a thickness of 9 μm used as a spacer, and a DC voltage of 800 V was applied in such a manner that the photosensitive member was positive, while the information recording medium was negative.

With the voltage being applied in this way, exposure was carried out for 0.1 sec. from the photosensitive member side with a 1,000 lux halogen lamp used as a light source. After the completion of the exposure, the information recording medium was taken out, thus completing the information recording. The exposed region was transparent; the transmittance of this region was 90%.

In addition, as a method of exposing the information recording medium, outdoor, daylight object photography was carried out using an ordinary camera through a gap and under the application of a voltage of 800 V in the same way as the above, with f=1.4 and a shutter speed of 1/60 sec. After the exposure, the information recording medium was taken out. It had information with gradation formed thereon.

Further, the medium was subjected to reading with a film scanner using a CCD sensor, and the read information was output by a sublimation transfer printer. As a result, a hard copy with gradation was obtained.

[EXAMPLE 4]

(Preparation of photosensitive member)

As a charge generating material, 3 parts of a bis-azo pigment used in Example 3 and 1 part of a mixed resin material comprising a vinyl chloride resin material and a vinyl acetate resin material (#1000D, manufactured by Denka Co., Ltd.) were thoroughly dispersed in a ball mill with a mixed solvent comprising dioxane and cyclohexane in the ratio of 1:1 to prepare a 100 g solution in which the solid matter content was 1.3%, and the solution was coated on the ITO side of a glass substrate having an ITO transparent electrode (thickness: about 500 Å; and resistance: 80 ohm/sq.) by using a blade coater having a gap of 2 mil and then dried for 1 hour at 100° C. to form a charge generation layer having a thickness of 0.3 μm. Next, as a charge transport material, 10 parts of 1,1-bis(4-diethylaminophenyl-1,3-butadiene (T-405, manufactured by Anan Co., Ltd.) and 1 part of a polystyrene resin material (MW-1, trade name; manufactured by Denka Co., Ltd.) were mixed with a mixed solvent comprising dichloromethane and 1,1,2-trichloroethane in the ratio of 4:6 so that the solid matter content in the resulting solution was 15%, and the solution thus prepared was coated on the above-described charge generation layer with a blade coater having a gap of 5 mil and then dried for 2 hours at 80° C. to form a charge transport layer having a thickness of 20 μm, thus preparing an organic photosensitive member.

In the meantime, an information recording medium was prepared in the same way as in Example 2 except that it had no upper electrode. The information recording medium and the photosensitive member prepared as described above were disposed face-to-face with each other with a polyester film having a thickness of 9 μm used as a spacer, and a DC voltage of 800 V was applied in such a manner that the photosensitive member was positive, while the information recording medium was negative.

With the voltage being applied in this way, exposure was carried out for 0.1 sec. from the photosensitive member side with a 1,000 lux halogen lamp used as a light source. After the completion of the exposure, the information recording medium was taken out, thus completing the information recording. The exposed region was transparent; the transmittance of this region was 90%.

In addition, as a method of exposing the information recording medium, object photography was carried out by applying light of 2,000 lux from the photosensitive member side, using an ordinary camera through a gap and under the application of a voltage of 800 V in the same way as the above, with f=4 and a shutter speed of 1/30 sec. After the exposure, the information recording medium was taken out. It had information with gradation formed thereon.

Further, the medium was subjected to reading with a film scanner using a CCD sensor, and the read information was output by a sublimation transfer printer. As a result, a hard copy with gradation was obtained.

The following is a description of the way of gradually increasing the voltage applied between the two electrodes to effect information recording.

Figure 14:
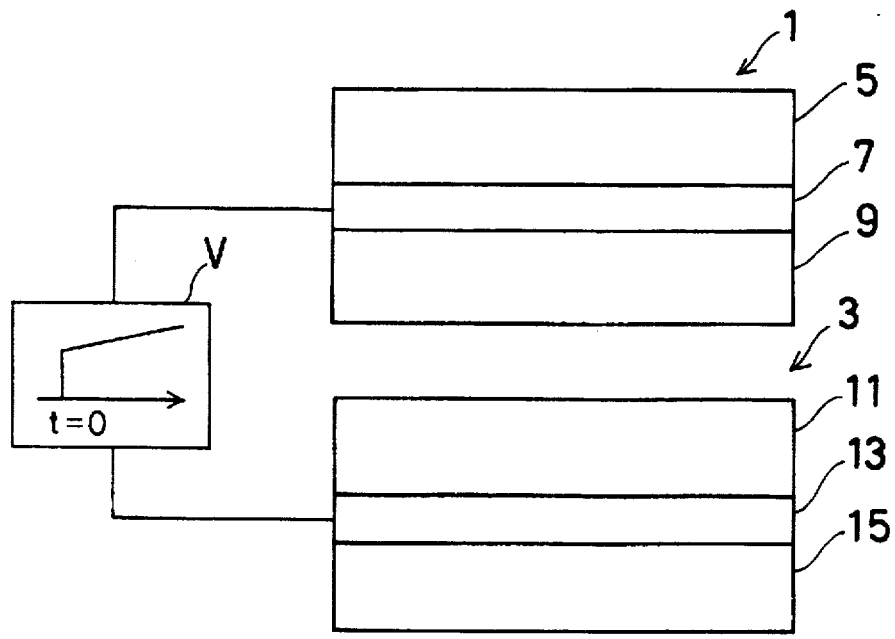
FIG. 14 is a block diagram showing the arrangement of another method of recording information on the information recording medium according to the present invention.

FIG. 14 shows a specific example of this voltage application method, in which a ramp-shaped voltage with a predetermined slope is applied between the respective electrodes of the photosensitive member 1 and the information recording medium 3 from the power supply V. In this case, the initial voltage, which is distributed in the ratio between the respective capacitances of the photosensitive member and the information recording medium, as described above, is set so that the voltage that is applied to the liquid crystal layer at this time is lower than the threshold value of the liquid crystal. Then, exposure is carried out by applying information light with the applied voltage being gradually increased. In consequence, the voltage that is distributed to the liquid crystal in the exposed region increases, and as the applied voltage is further increased, dark current also flows through the unexposed region, so that the dark potential also rises. When exposure is carried out with information light at the timing at which the potential difference between the exposed and unexposed regions reaches a maximum, the highest contrast is obtained.

Figure 15:
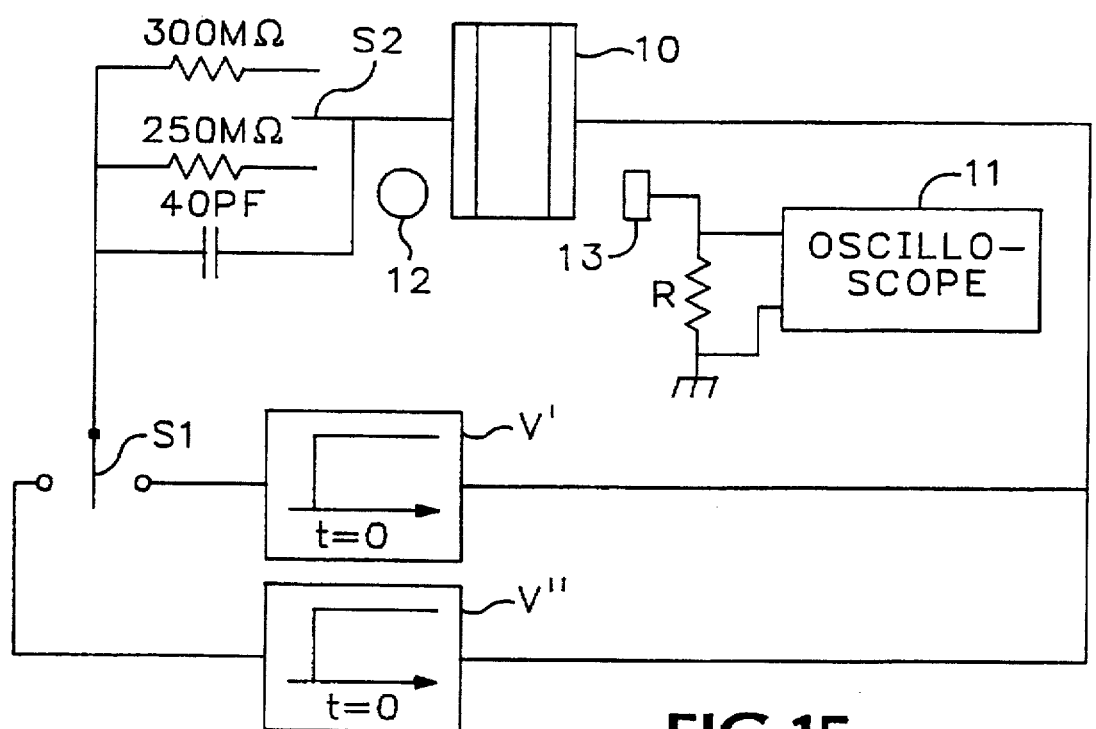
FIG. 15 illustrates a simulation of the method of recording information on the first information recording medium according to the present invention.

The above-described voltage application method will be further explained in detail by way of a simulation that uses a liquid crystal element 10 shown in FIG. 15. Referring to the figure, a power supply V' is used to apply a constant voltage in a step-like form, while a power supply V" is used to apply a voltage that increases at a predetermined rate from the initial voltage level in a ramp-like form. These two voltages are changed over from one to the other by a switch S1 so as to be applied to the liquid crystal element 10 through a parallel circuit comprising a capacitance of 40 pF and either a resistance of 250 MΩ or 300 MΩ. The capacitance of 40 pF is equivalent to the capacitance of the photosensitive member, while the resistances of 250 MΩ and 300 MΩ are equivalent to the respective resistances of the photosensitive member at the exposed and unexposed regions. The two resistances are changed over from one to the other by a switch S2. The degree of modulation that is obtained when a voltage is applied to the liquid crystal element 10 is measured with a photoelectric detector 13 that detects light from a light source 12 which is transmitted through the liquid crystal element 10, and the waveform of the detected light is measured with an oscilloscope 11.

It should be noted that the degree of modulation M is defined by $$M = \frac{\log(T/T_{OFF})}{\log(T_{ON}/T_{OFF})} \times 100(\%) \qquad (I)$$

where $T_{OFF}$ is the quantity of light transmitted when no voltage is applied; $T_{ON}$ is the quantity of light transmitted when a sufficiently high voltage is applied; and T is the quantity of light transmitted when the voltage V is applied.

Figure 16A:
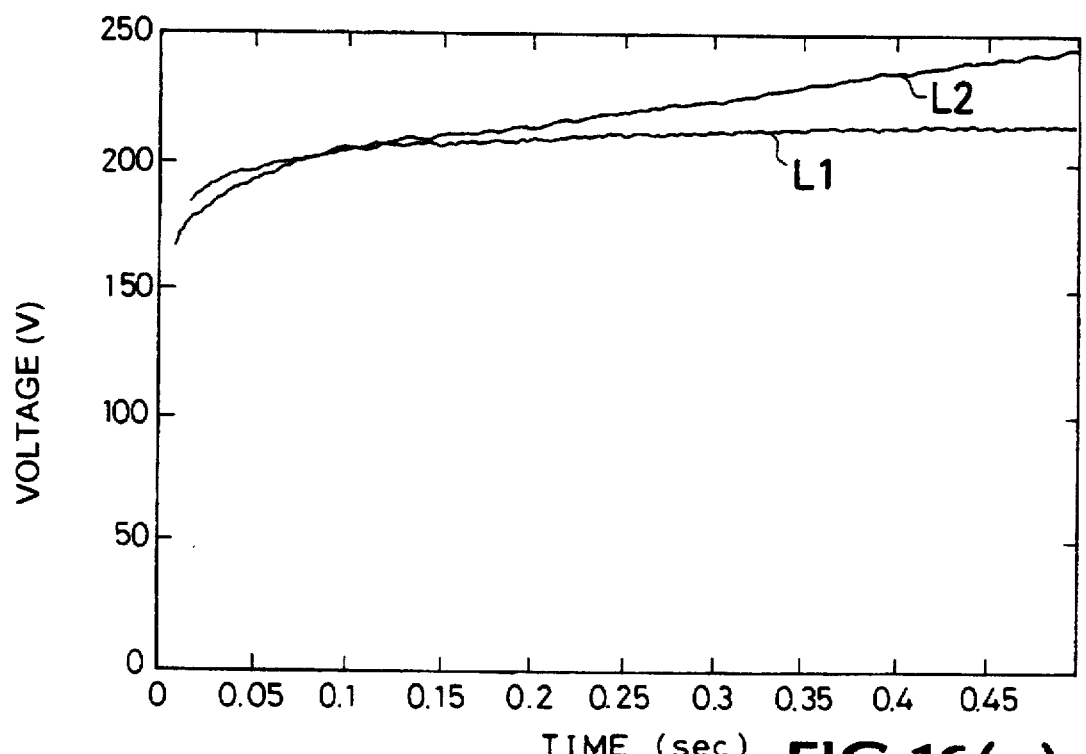
FIGS. 16(a) and 16(b) are graphs showing the characteristics of the effective voltage applied to the liquid crystal with respect to the time elapsed.
Figure 16B:
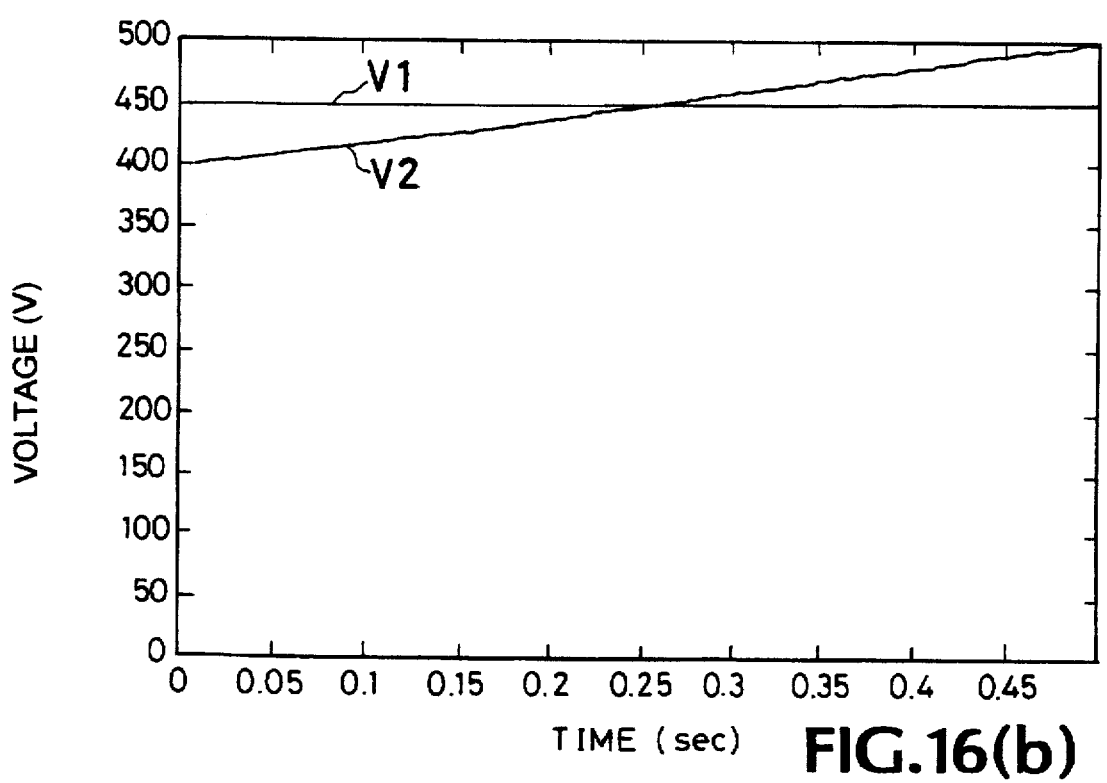

First, a constant voltage of 450 V (characteristics V1) was applied from the power supply V', and a ramp-shaped voltage (characteristics V2) that rose from an initial voltage of 400 V to 500 V in 0.5 sec. was applied from the power supply V", as shown in FIG. 16(b). At this time, the effective voltages applied to the liquid crystal were such as those having characteristics L1 and L2 shown in FIG. 16(a). In this case, the average value of the applied voltage is the same, i.e., 450 V, but the effective voltage that is applied to the liquid crystal by the ramp-shaped voltage is already higher than that by the step-shaped voltage at the time of 0.1 sec when the ramp-shaped voltage is lower than the step-shaped voltage, which shows the advantage of application of the ramp-shaped voltage.

In addition, the degree of modulation obtained when each of the step- and ramp-shaped voltages was applied was determined according to the above Equation (1), and the change of electric current (amount of electric charge) flowing through the circuit with respect to the degree of modulation was obtained. FIG. 17 shows the results of the measurement. In the figure, □ shows the results obtained when the step-shaped voltage was applied, and ○ shows the results obtained when the ramp-shaped voltage was applied.

It will be understood from the figure that in the case of the step-shaped voltage the current needed to reach the modulation percentage of 90% is about 1.5 times that in the case of the ramp-shaped voltage. Thus, in the case of the step-shaped voltage, a high-performance photosensitive member whose resistance is changed greatly on application of exposure light is needed in order to obtain the same of modulation as that in the case of the ramp-shaped voltage. In contrast, the ramp-shaped voltage enables a relatively high effective voltage to be applied to the liquid crystal and hence allows proper recording even if the photosensitive member characteristics are not so excellent.

Figure 18A:
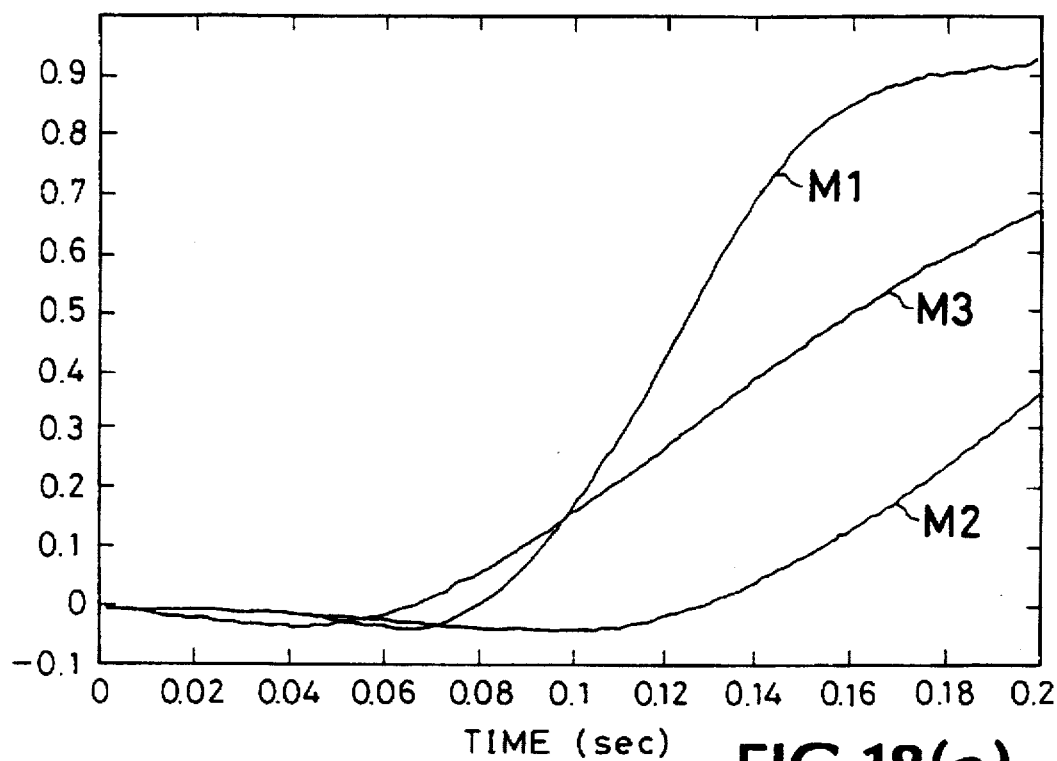
FIGS. 18(a) and 18(b) are graphs showing the characteristics of the degree of modulation with respect to the time.
Figure 18B:
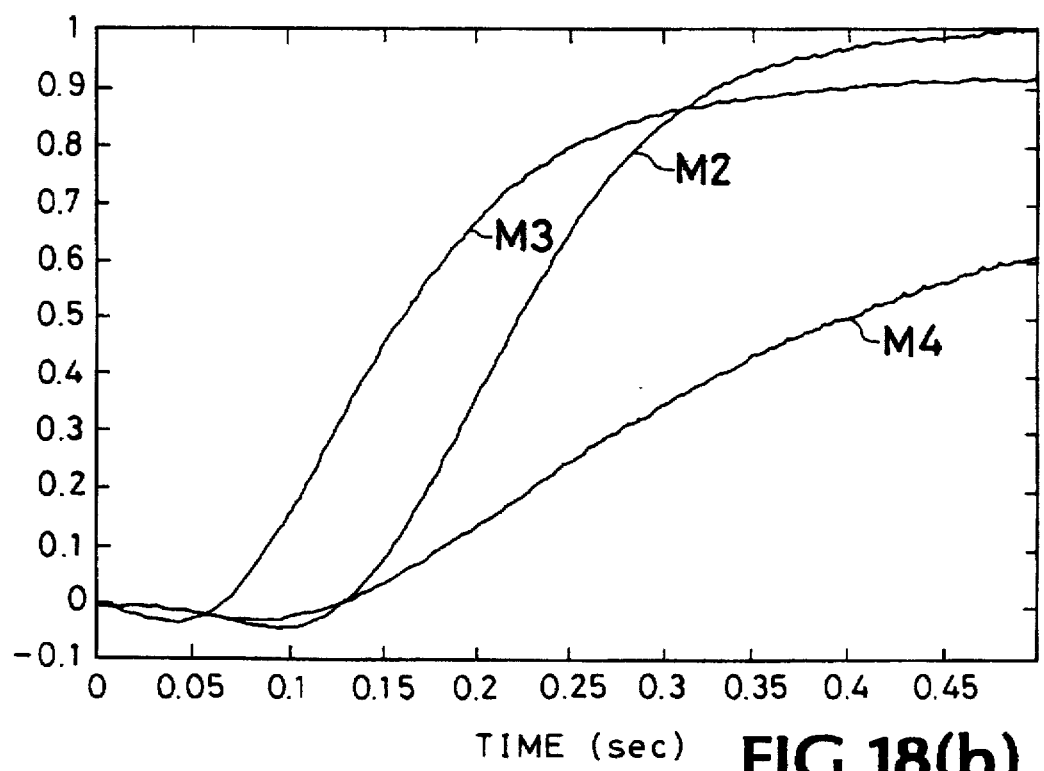

FIG. 18(a) and 18(b) are graphs showing the characteristics of the degree of modulation with respect to the time obtained when step- and ramp-shaped voltages were applied.

Referring to FIG. 18(a), the characteristic curve M1 shows the change of the degree of modulation when the applied voltage was raised from 400 V to 500 V in 200 msec; the characteristic curve M2 shows the change of the degree of modulation when the applied voltage was raised from 400 V to 500 V in 500 msec; and the characteristic curve M3 shows the change of the degree of modulation when the applied voltage was constant at 470 V. The characteristic curve M1 is steeper than the characteristic curve M2. Thus, it will be understood that the higher the voltage increasing rate, i.e., the steeper the slope of the voltage rising curve, the better.

Referring to FIG. 18(b), M2 and M3 are the same as those shown in FIG. 18(a) except that the time span was extended to 0.5 sec., and the characteristic curve M4 shows the change of the degree of modulation when the applied voltage was constant at 450 V. It will be understood from the graph that in the case of the characteristics M3 and M4, the degree of modulation is undesirably saturated, whereas, in the case of the characteristics M2, the modulation degree of 1 can be attained. Accordingly, it is possible to obtain a sufficiently high contrast and hence possible to effect recording with good image quality. In addition, the characteristic curve M2 is steeper than the characteristic curve M3; therefore, the characteristics represented by the curve M2 are advantageous in obtaining a high contrast.

Figure 19A:
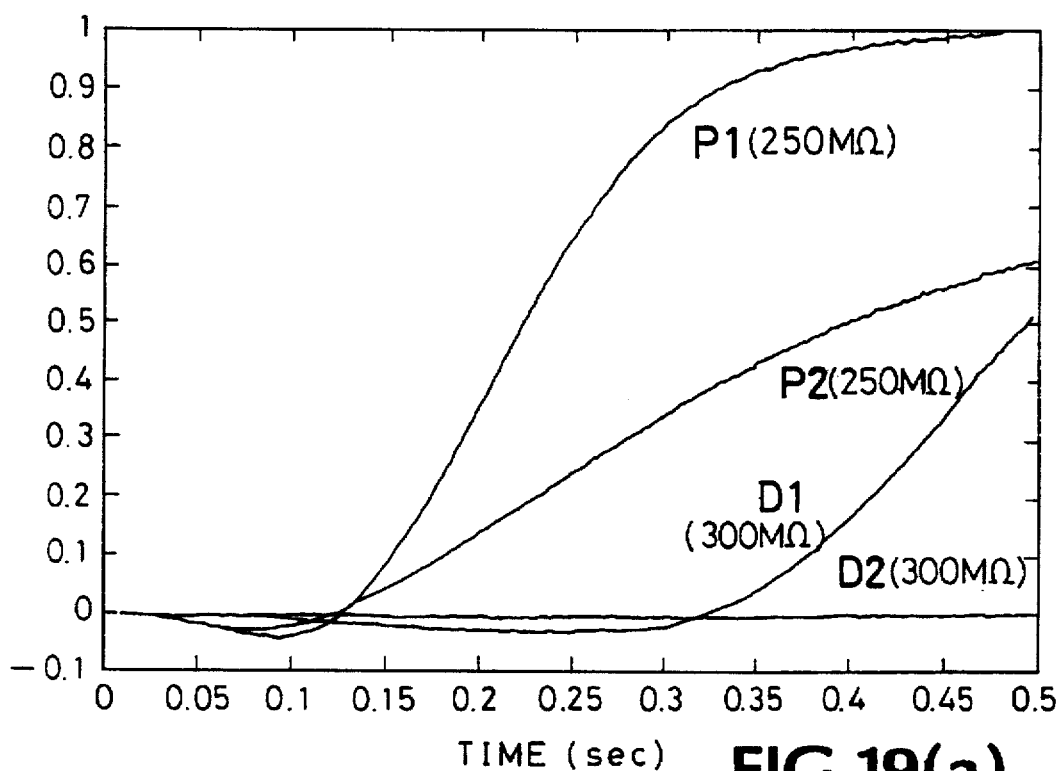
FIGS. 19(a) and 19(b) are graphs showing the modulation degree-to-time characteristics of exposed and unexposed regions.
Figure 19B:
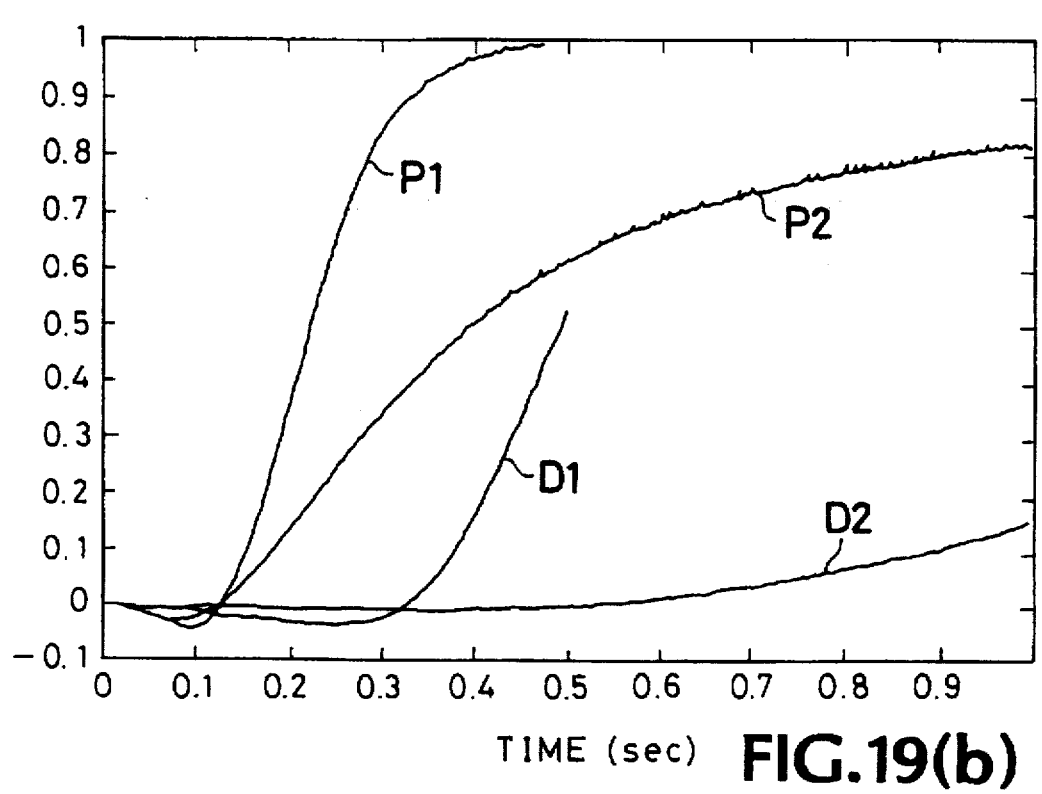

FIG. 19(a) and 19(b) are graphs showing modulation degree characteristics obtained with 250 MΩ and 300 MΩ. In the graph, P1 and D1 show modulation degree characteristics obtained with 250 MΩ and 300 MΩ upon application of a ramp-shaped voltage (400 V→500 V/0.5 sec.), while P2 and D2 show modulation degree characteristics obtained with 250 MΩ and 300 MΩ upon application of a step-shaped voltage (constant at 450 V). FIGS. 19(a) and 19(b) are the same except for the time span. It will be understood from these graphs that the application of the ramp-shaped voltage makes it possible to obtain a larger difference between the characteristics P1 and D1 than in the case of the step-shaped voltage, and that the difference between P1 and D1 reaches a maximum at the timing of about 0.3 sec., for example; therefore, if exposure is carried out with information light at this timing, information recording with an excellent contrast can be obtained. In contrast, the step-shaped voltage needs a relatively long time to increase the degree of modulation and is incapable of obtaining a large difference between P2 and D2, resulting in an inferior contrast.

Although in the above-described Example the voltage is raised with a constant slope, it should be noted that the degree of slope may be changed with time. Further, although in the foregoing the liquid crystal recording medium is of the transmissive type, the present invention is also applicable to a reflective liquid crystal recording medium.

[EXAMPLE 5]

As a charge generating material, 3 parts of a bis-azo pigment used in the above-described Example 3 and 1 part of a polyvinyl acetal resin material were thoroughly dispersed in a ball mill with a mixed solvent comprising dioxane and cyclohexane in the ratio of 1:1 to prepare a 100 g solution in which the solid matter content was 2%, and the solution was coated on the ITO side of a glass substrate having an ITO transparent electrode (thickness: about 500 Å; and resistance: 80 ohm/sq.) by using a blade coater having a gap of 2 mil and then dried for 1 hour at 100° C. to form a charge generation layer having a thickness of 0.3 μm.

Next, as a charge transport material, 15 parts of p-diethylaminobenzaldehyde-N-phenyl-benzylhydrazone and 10 parts of a polycarbonate resin material (Iupilon S-100, trade name; manufactured by Mitsubishi Gas Chemical Industries Ltd.) were mixed with a mixed solvent comprising dichloromethane and 1,1,2-trichloroethane in the ratio of 4:6 so that the solid matter content in the resulting solution was 17.8%, and the solution thus prepared was coated on the above-described charge generation layer with a blade coater having a gap of 2 mil and then dried for 2 hours at 80° C. to form a charge transport layer having a thickness of 10 μm.

Subsequently, a fluorocarbon resin material (Cytop, trade name; manufactured by Asahi Glass Company, Ltd. and having a water absorption of 0.01% and a resistivity of $1 \times 10^{18}$ ohm-cm) was dissolved in perfluoro(2-butyltetrahydrofuran) to prepare a 4.5% solution, which was coated on the above-described charge transport layer by using a spin coater under the conditions of 1,500 rpm and 20 sec. and then dried for 3 hours at 80° C., thereby forming a transparent insulating layer having a thickness of about 0.3 μm.

Further, an information recording layer of a polymer dispersed liquid crystal was formed on the transparent insulating layer as follows: 4 parts of dipentaerythritol hexaacrylate, 6 parts of a smectic liquid crystal, S6 (trade name; manufactured by Merck & Co. Ltd.), 0.2 parts of a fluorocarbon surface-active agent, Fluorad FC-430 (trade name; manufactured by 3M), and 0.2 parts of a photopolymerization initiator, "Darocure 1173" (trade name; manufactured by Merck & Co., Inc.) were mixed together with xylene so that the solid matter content in the resulting solution was 30%, and this solution was coated on the above-described transparent insulating layer by using a blade coater having a gap of 50 µm. With the coating held at 50° C., UV light of 0.3 J/cm$^2$ was applied thereto, thereby obtaining an information recording layer of polymer dispersed liquid crystal having a thickness of about 6 µm.

A cross-section of the information recording layer was dried after the liquid crystal was extracted with hot methanol, and then the internal structure of the information recording layer was observed with a scanning electron microscope having a magnifying power of 10,000 (S-800, manufactured by Hitachi, Ltd.). As a result, it was revealed that the surface of the information recording layer was covered with the ultraviolet curing resin material having a thickness of 0.6 µm and the inside of the layer was filled with resin particles having a particle diameter of the submicron order in the same way as in FIG. 13.

Next, ITO was grown to a thickness of about 200 Å on the information recording layer by sputtering to form a transparent electrode, thereby preparing an information recording medium according to the present invention.

Then, exposure was carried out by projecting a gray scale on the photoconductive layer side of the information recording medium and, at the same time, a DC voltage of 1,200 V was applied between the ITO electrodes for 0.1 sec. in such a manner that the photoconductive layer side was positive, while the information recording layer side was negative. As a result, an image corresponding to the gray scale was formed on the information recording layer by the transmitted light. Thus, it was confirmed that an image having an adequate contrast even at the low exposure side of the gray scale was obtained by the transmitted light.

Further, the information recording medium was subjected to reading with a scanner using a CCD line sensor, and the read information was output by a sublimation transfer printer. As a result, a hard copy with gradation was obtained with high resolution.

[EXAMPLE 6]

An indium-tin oxide transparent electrode (100 ohm/sq.) was grown on a glass substrate (7059, manufactured by Corning Inc., 45×50 mm in size and 1.1 mm in thickness) by electron-beam vapor deposition, and an SiO$_2$ film (0.1 µm) was grown as a charge injection preventing layer on the electrode by sputtering.

On the charge injection preventing layer, a vacuum-deposited a-selenium-tellurium mixture layer (tellurium concentration: 42%) was grown to a thickness of 0.1 µm as a charge generation layer. The deposition conditions were as follows: A vacuum evaporation system (JEE-4B, manufactured by Japan Electron Optics Laboratory Co., Ltd.) was used; the ultimate vacuum was 2.0×10$^{-5}$ torr; and granular selenium (purity: 99.999%; manufactured by Mitsubishi Metal Corp.) and granular tellurium (purity: 99.99%; manufactured by High Purity Chemicals) were used as evaporation materials and evaporated respectively by using an alumina crucible (manufactured by Niraco Co., Ltd.) and a boat for sublimate metal (manufactured by Niraco Co., Ltd.).

Evaporation was carried out with the substrate maintained in room temperature conditions by water-cooling the substrate holder so as to prevent crystallization of selenium and diffusion of tellurium, and with the evaporation rates of the evaporation sources of selenium and tellurium being measured independently with a quartz oscillator film thickness meter (CRTM-7000, manufactured by Ulvac Corp.), and with the evaporation source power sources being subjected to feedback control so as to obtain a predetermined ratio of evaporation rates. The ratio of evaporation rates was determined so that the desired composition was obtained on the basis of calibration curves for the composition prepared in advance. When the tellurium concentration was 42%, the ratio of the evaporation rate of selenium to that of tellurium was determined to be 20:10.

Next, selenium alone was deposited (to a thickness of 3 µm) to form a charge transport layer, thus producing a photoconductive layer of the present invention.

Subsequently, an information recording layer of a polymer dispersed liquid crystal and a transparent electrode layer were successively formed on the charge transport layer in the same way as in Example 5, thereby preparing an information recording medium of the present invention.

Then, exposure was carried out by projecting a gray scale on the photoconductive layer side of the information recording medium and, at the same time, a DC voltage of 500 V was applied between the ITO electrodes for 0.1 sec. in such a manner that the photoconductive layer side was positive, while the information recording layer side was negative. As a result, an image corresponding to the gray scale was formed on the information recording layer by the transmitted light. Thus, it was confirmed that an image having an adequate contrast even at the low exposure side of the gray scale was obtained by the transmitted light.

[EXAMPLE 7]

A charge generation layer and a charge transport layer were successively stacked on the ITO side of a glass substrate having an ITO transparent electrode (thickness: about 500 Å; and resistance: 80 ohm/sq.) in the same way as in Example 5.

Next, SiO$_2$ was stacked on the charge transport layer to a thickness of 2,500 Å by EB vapor deposition, thereby forming a transparent insulating layer.

Subsequently, an information recording layer of a polymer dispersed liquid crystal and a transparent electrode layer were successively formed on the charge transport layer in the same way as in Example 5, thereby preparing an information recording medium of the present invention.

Then, exposure was carried out by projecting a gray scale on the photoconductive layer side of the information recording medium and, at the same time, a DC voltage of 800 V was applied between the ITO electrodes for 0.1 sec. in such a manner that the photoconductive layer side was positive, while the information recording layer side was negative. As a result, an image corresponding to the gray scale was formed on the information recording layer by the transmitted light. Thus, it was confirmed that an image having an adequate contrast even at the low exposure side of the gray scale was obtained by the transmitted light.

[EXAMPLE 8]

A charge generation layer and a charge transport layer were successively stacked on the ITO side of a glass substrate having an ITO transparent electrode (thickness:

about 500 Å; and resistance: 80 ohm/sq.) in the same way as in Example 5, thereby forming a photoconductive layer.

Next, polyvinyl alcohol, Gosenol KL-250 (trade name; manufactured by Nippon Synthetic Chemical Industry Co., Ltd.) was dissolved in distilled water to obtain a solution in which the solid matter content was 5%, and the solution was coated on the above-described photoconductive layer by spin coating under the conditions of 1,000 rpm and 20 sec. and then dried for 3 hours at 80° C., thereby forming a transparent insulating layer having a thickness of about 0.2 μm.

Subsequently, an information recording layer of a polymer dispersed liquid crystal and a transparent electrode layer were successively formed on the transparent insulating layer in the same way as in Example 5, thereby preparing an information recording medium of the present invention.

Then, exposure was carried out by projecting a gray scale on the photoConductive layer side of the information recording medium and, at the same time, a DC voltage of 1,400 V was applied between the ITO electrodes for 0.1 sec. in such a manner that the photoconductive layer side was positive, while the information recording layer side was negative. As a result, an image corresponding to the gray scale was formed on the information recording layer by the transmitted light. Thus, it was confirmed that an image having an adequate contrast even at the low exposure side of the gray scale was obtained by the transmitted light.

[EXAMPLE 9]

A charge generation layer and a charge transport layer were successively stacked on the ITO side of a glass substrate having an ITO transparent electrode (thickness: about 500 Å; and resistance: 80 ohm/sq.) in the same way as in Example 5, thereby forming a photoconductive layer. Next, a fluorine-containing resin coating material, "Fluorad FC-722" (trade name; manufactured by 3M and having a volume resistivity of $2.7 \times 10^{16}$ ohm-cm) was coated on the photoconductive layer by using a blade coater having a gap of 2 mil and then dried for 3 hours at 80° C., thereby forming a transparent insulating layer having a thickness of about of 0.3 μm.

Subsequently, an information recording layer of a polymer dispersed liquid crystal and a transparent electrode layer were successively formed on the transparent insulating layer in the same way as in Example 5, thereby preparing an information recording medium of the present invention.

Then, exposure was carried out by projecting a gray scale on the photoconductive layer side of the information recording medium and, at the same time, a DC voltage of 800 V was applied between the ITO electrodes for 0.1 sec. in such a manner that the photoconductive layer side was positive, while the information recording layer side was negative. As a result, an image corresponding to the gray scale was formed on the information recording layer by the transmitted light. Thus, it was confirmed that an image having an adequate contrast even at the low exposure side of the gray scale was obtained by the transmitted light.

[EXAMPLE 10]

A charge generation layer and a charge transport layer were successively stacked on the ITO side of a glass substrate having an ITO transparent electrode (thickness: about 500 Å; and resistance: 80 ohm/sq.) in the same way as in Example 5, thereby forming a photoconductive layer.

Next, a diparaxylylene of the structural formula:

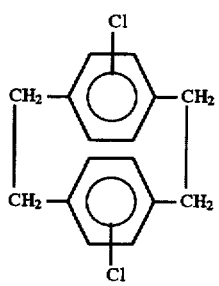

was subjected to vapor phase polymerization under a vacuum to grow poly-monochloroparaxylylene on the photoconductive layer to a thickness of about 0.6 μm, thereby forming a transparent insulating layer.

Subsequently, an information recording layer of a polymer dispersed liquid crystal and a transparent electrode layer were successively formed on the transparent insulating layer in the same way as in Example 5, thereby preparing an information recording medium of the present invention.

Then, exposure was carried out by projecting a gray scale on the photoconductive layer side of the information recording medium and, at the same time, a DC voltage of 600 V was applied between the ITO electrodes for 0.1 sec. in such a manner that the photoconductive layer side was positive, while the information recording layer side was negative. As a result, an image corresponding to the gray scale was formed on the information recording layer by the transmitted light. Thus, it was confirmed that an image having an adequate contrast even at the low exposure side of the gray scale was obtained by the transmitted light.

[EXAMPLE 11]

As a charge generating material, 3 parts of a bis-azo pigment used in Example 3 and 1 part of a mixed resin material comprising a vinyl chloride resin material and a vinyl acetate resin material (#1000D, trade name; manufactured by Denka Co., Ltd.) were thoroughly dispersed in a ball mill with a mixed solvent comprising dioxane and cyclohexane in the ratio of 1:1 to prepare a 100 g solution in which the solid matter content was 1.3%, and the solution was coated on the ITO side of a glass substrate having an ITO transparent electrode (film thickness: about 500 Å; and resistance: 80 ohm/sq.) by using a blade coater having a gap of 2 mil and then dried for 1 hour at 100° C. to form a charge generation layer having a thickness of 0.3 μm.

Next, as a charge transport material, 10 parts of 1,1-bis (4-diethylaminophenyl-4,4-diphenyl-1,3-butadiene and 1 part of a polystyrene resin material (MW-1, trade name; manufactured by Denka Co., Ltd.) were mixed with a mixed solvent comprising dichloromethane and 1,1,2-trichloroethane in the ratio of 4:6 so that the solid matter content in the resulting solution was 15%, and the solution thus prepared was coated on the above-described charge generation layer with a blade coater having a gap of 5 mil and then dried for 2 hours at 80° C. to form a charge transport layer having a thickness of 20 μm.

Subsequently, a transparent insulating layer was formed on the above-described charge transport layer by using polyparaxylylene in the same way as in Example 10. Further, an information recording layer of a polymer dispersed liquid crystal was formed on the transparent insulating layer as follows: 4 parts of dipentaerythritol hexaacrylate, 6 parts of a smectic liquid crystal, S1 (trade name; manufactured by Merck & Co. Ltd.), 0.2 parts of a fluorocarbon surface-active agent, Fluorad FC-430 (trade name; manufactured by 3M), and 0.2 parts of a photopolymerization initiator, "Darocure 1173" (trade name; manufactured by Merck & Co., Inc.) were mixed together with xylene so that the solid matter content in the resulting solution was 50%, and this solution was coated on the above-described transparent insulating layer by using a blade coater having a gap of 50 μm. With the coating held at 32° C., UV light of 0.6 J/cm² was applied thereto, thereby obtaining an information recording layer of polymer dispersed liquid crystal having a thickness of about 6 μm.

Further, a transparent electrode was stacked on the information recording layer in the same way as in Example 5.

Then, exposure was carried out by projecting a gray scale on the photoconductive layer side of the information recording medium and, at the same time, a DC voltage of 600 V was applied between the ITO electrodes for 1/30 sec. in such a manner that the photoconductive layer side was positive, while the information recording layer side was negative. As a result, an image corresponding to the gray scale was formed on the information recording layer by the transmitted light. Thus, it was confirmed that an image having an adequate contrast even at the low exposure side of the gray scale was obtained by the transmitted light.

[Comparative Example 1]

An information recording medium was prepared in the same way as in Example 1 except that a bisphenol A resin material (Epikote 828, manufactured by Yuka Shell Epoxy Co., Ltd.), which is a thermosetting resin material, was used in place of the resin material used in Example 1, together with an aliphatic curing agent (B-002, manufactured by Yuka Shell Epoxy Co., Ltd.) and that the material was set by heating it to 60° C.

When information was recorded on this information recording medium in the same way as in Example 1, the information recording surface was stained by bleeding, which revealed that the liquid crystal oozed out on the surface. In addition, the resistivity was as low as $10^8$ ohm-cm/sq.

[Comparative Example 2]

An information recording medium was prepared in the same way as in Example 5 except that a bisphenol resin material (Epikote 828, manufactured by Yuka Shell Epoxy Co., Ltd.), which is a thermosetting resin material, was used in place of the resin material used in Example 5, together with an aliphatic curing agent (B-002, manufactured by Yuka Shell Epoxy Co., Ltd.) and that the material was set by heating it to 60° C.

When information was recorded on this information recording medium in the same way as in Example 5, the information recording surface was stained by bleeding, which revealed that the liquid crystal oozed out on the surface.

What we claim is:

1. A method of producing an information recording medium, said method comprising the steps of: forming a transparent common electrode by sputtering on a transparent first flexible base film continuously supplied, and forming a contact reinforcing electrode by evaporation on said transparent common electrode along one edge of said first flexible base film; coating a photoconductive layer or a stack of a photoconductive layer and either a transparent insulating layer or a transparent semiconductor layer on said transparent common electrode; forming a transparent area selecting electrode in a belt-shaped pattern by sputtering on a second flexible base film continuously supplied so that said area selecting electrode extends from one edge to the other edge of said second flexible base film, and forming a contact reinforcing electrode on a root portion of said area selecting electrode by evaporation; continuously supplying said first flexible base film formed with the stack of the transparent common electrode and the photoconductive layer or the stack of the transparent common electrode, the photoconductive layer and the transparent insulating layer or the transparent semiconductor layer and said second flexible base film formed with the area selecting electrode, and coating an information recording layer comprising a liquid crystal dispersed and fixed in an ultraviolet curing resin material on the electrode layer side of either said first or second flexible base film, and curing said resin material by irradiation with ultraviolet rays with said two base films butted against each other; and cutting the resulting information recording medium after said resin material has been cured.

2. A method of producing an information recording medium, said method comprising the steps of: forming a transparent common electrode by sputtering on a transparent first flexible base film continuously supplied, and forming a contact reinforcing electrode by evaporation on said transparent common electrode along one edge of said first flexible base film; coating a photoconductive layer or a stack of a photoconductive layer and either a transparent insulating layer or a transparent semiconductor layer on said transparent common electrode; forming a transparent area selecting electrode in a belt-shaped pattern by sputtering on a second flexible base film continuously supplied so that said area selecting electrode extends from one edge to the other edge of said second flexible base film, and forming a contact reinforcing electrode on a root portion of said area selecting electrode by evaporation; continuously supplying said first flexible base film formed with the stack of the transparent common electrode and the photoconductive layer or the stack of the transparent common electrode, the photoconductive layer and the transparent insulating layer or the transparent semiconductor layer and said second flexible base film formed with the area selecting electrode, and in the absence of a rigid spacer, coating an information recording layer comprising a liquid crystal dispersed and fixed in an ultraviolet curing resin material on the electrode layer side of either said first or second flexible base film, and curing said resin material by irradiation with ultraviolet rays with said two base films butted against each other; and cutting the resulting information recording medium after said resin material has been cured.

* * * * *